US006671655B2

(12) United States Patent
Moccio

(10) Patent No.: US 6,671,655 B2
(45) Date of Patent: Dec. 30, 2003

(54) STRATEGY BASED DIAGNOSTIC SYSTEM

(76) Inventor: John A Moccio, 460 Harbour Island Rd., Orlando, FL (US) 32809

( * ) Notice: Subject to any disclaimer, the term of this patent is extended or adjusted under 35 U.S.C. 154(b) by 266 days.

(21) Appl. No.: 09/752,006

(22) Filed: Dec. 28, 2000

(65) Prior Publication Data
US 2002/0087236 A1 Jul. 4, 2002

(51) Int. Cl.[7] .............................................. G06F 19/00
(52) U.S. Cl. ........................................ 702/183; 701/29
(58) Field of Search ................................. 702/183, 182, 702/184, 185; 701/29; 706/911, 912, 913

(56) References Cited

U.S. PATENT DOCUMENTS

| | | | |
|---|---|---|---|
| 5,299,121 A | 3/1994 | Brill et al. | 364/413.01 |
| 5,414,626 A | 5/1995 | Boorse et al. | 364/424.03 |
| 5,432,904 A | 7/1995 | Wong | 395/161 |
| 5,539,869 A | 7/1996 | Spoto et al. | 395/154 |
| 5,774,361 A | 6/1998 | Colarelli, III et al. | 364/424.034 |
| 5,778,381 A | 7/1998 | Sandifer | 707/104 |

Primary Examiner—Patrick Assouad
(74) Attorney, Agent, or Firm—Brian S. Steinberger; Law Offices of Brian S. Steinberger, P. A.

(57) ABSTRACT

A Strategy Based Diagnostic System having a user friendly diagnostic software data base for electrical/hydraulic/vacuum/pneumatic systems. The front end of the software program will be on existing platforms such as but not limited to WINDOWS®, INTERNET EXPLORER®, or NETSCAPE NAVIGATOR®. Upon entering the information of the item or vehicle or circuit or system of interest into the program, it will go to the stored library and bring the schematic of the system up on the screen. It will also bring up a dashboard template of the product one is working on with a showing of the appropriate buttons. One can then click on the appropriate buttons and it will go the appropriate sub libraries and retrieve the requisite information. Another feature of the program is that it shows animated electrical/hydraulic flow which flow will change as one adjusts the button on the dashboard. This program features simulation data derived from a known good unit. One adjusts the buttons on the dashboard to match the product you are working on and compare it with the stated simulation data specifications to help in the diagnostic process. The programmed system can be made available via the Internet as by subscription or fee per use.

20 Claims, 32 Drawing Sheets

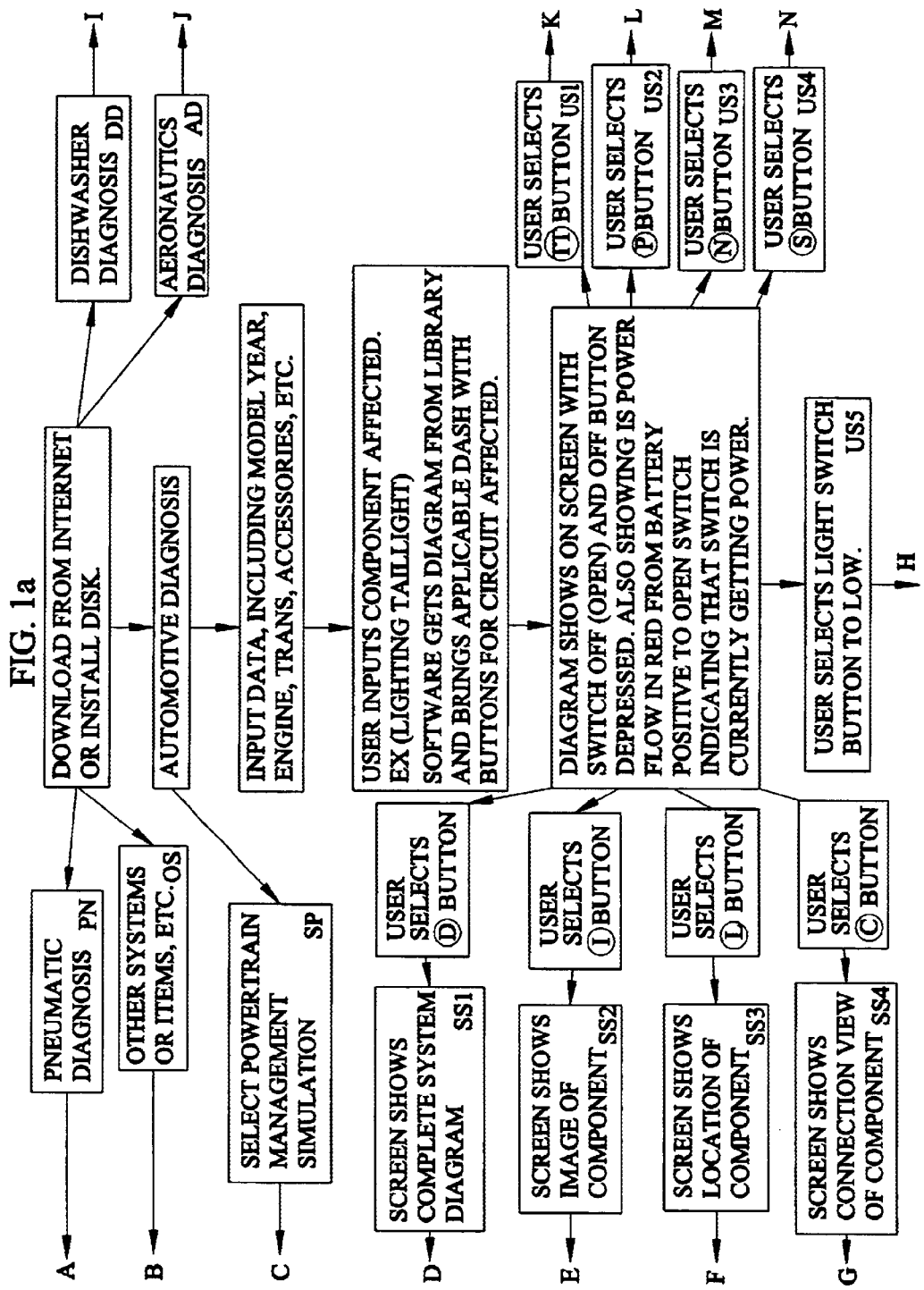

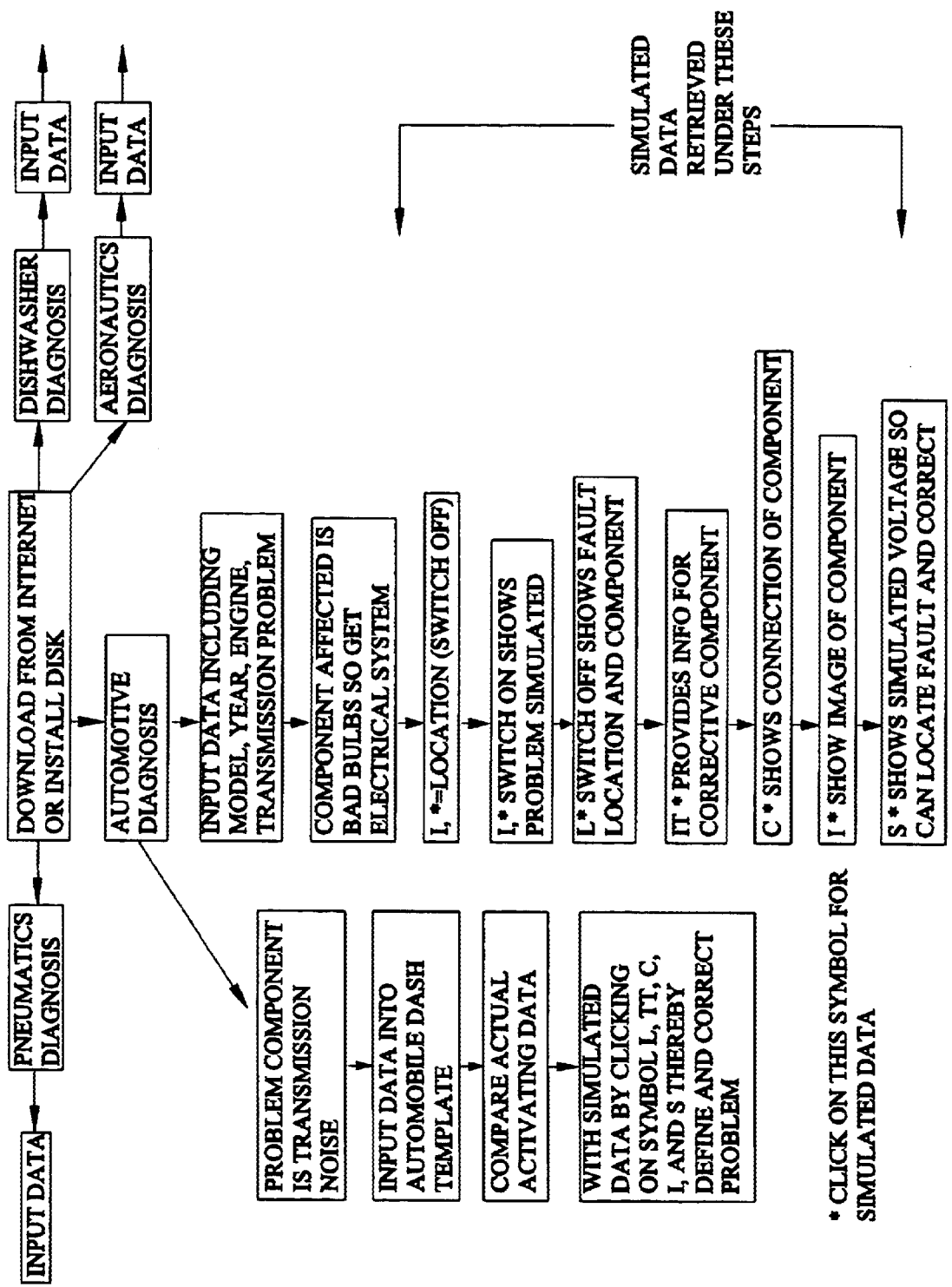

② CHECK ALL NUMBER TWOS FOR BATTERY VOLTAGE WITH ENGINE KEY OFF.

STRATEGY BASED DIAGNOSTIC SYSTEM

This invention relates to diagnostic systems and in particular to a stand-alone diagnostic software tool for providing a diagnostic check of vehicles, such as automobiles and machinery.

BACKGROUND AND PRIOR ART

In this developing technological society, most dynamic operating equipment rapidly change and generally become more complex so that when it becomes inoperable, the technician who must repair it seeks out specific information enabling him to do so. This is a very time-consuming series of requisite actions that need to be shortened in duration.

Illustrative of the foregoing is the repair of automobiles. Most of us upon taking our car to the mechanic after seeing the "check engine" light appear to have heard with distress that phrase "we must check the computer chips". Automotive diagnostics of today's vehicles is very different than it was even 5 years ago. With technical information coming in at a rate of over 12,000 pages per month and the fact that there are over 20,000 combinations of years, makes and models of cars currently on the road and over 7,000 service manuals, it is virtually impossible for the mechanic to stay current and retain everything he learns.

The Chilton Auto and Motorcycle manuals are widely known as printed documents available to facilitate repair and/or replacement of the defective part of the vehicle.

Spoto et al in U.S. Pat. No. 5,539,869 describes a diagnostic software system for "processing and presenting on-line multimedia information such as diagnostic information for a machine tool for use (which uses) . . . graphics, documentation, drawings, photographs . . . (and is) user friendly", abstract, uses Question and Answer formats on-line FIGS. 3 and 4, simplified pictures of parts and their locations. FIGS. 7–21, and is specifically used to enhance repairs to machinery. It also describes taking text, photos, animation data for creating diagnostic knowledge from past data, but does not specifically describe taking all technical manual data on the automobile and machinery for the knowledge data base. It is not very visual and does not show a dashboard or template of the equipment being tested or show the relationship between the buttons you push on the dashboard and the specifications of the item being tested. It appears to be nothing more then a flow chart with some pictures added.

Sandifer in U.S. Pat. No. 5,778,381 and Boorse et al in U.S. Pat. No. 5,414,626 to who each describe diagnostic software tools that use technical manual type publications for the databases used with the diagnostic tools. Sandifer appears to be user friendly but does not have anything to do with electronic or hydraulic diagnostics and does not guide one through any diagnostic procedures. Boorse et al is merely an emissions parts locator and image system. It does not guide one through any repairs and does not give the specifications at each wire thus helping any diagnosis of the system.

Complicating the foregoing is data which suggest that if one were to learn something new and then called upon to use it, there would be a loss of what one learned as follows: after 20 minutes, one would have forgotten 41.8%; after one hour, one would have forgotten 55.8%; after one day, one would have forgotten 66.3%; and after six days, one would have forgotten 98.5%. This is another of the reasons that improved diagnostic systems have become a necessity in the automotive industry as well as other industries involving dynamic operating machinery.

SUMMARY OF THE INVENTION

The first objective of the present invention is to provide an improved diagnostic system for machinery repair.

The second object of this invention is to provide an improved diagnostic program for electrical, hydraulic, vacuum and/or pneumatic systems.

The third object of this invention is to provide an improved diagnostic program for automobile repair.

The fourth object of this invention is to provide a multi-phase diagnostic system having a first phase providing for identification of the system to be repaired and thereafter a second phase featuring simulation capabilities.

A preferred embodiment of the invention is a method of diagnosing a malfunction of a machinery system utilizing a video monitor onto which a technician can screen pages from a library comprising the steps of: withdrawing from a first portion of said library a template onto which the technician can enter information relating to said machinery system; manually entering said information defining a specific machine and a malfunctioning segment onto said template; withdrawing from a second portion of said library a screen provoked by said manually entered information, said screen showing a schematic of the malfunctioning segment with a plurality of buttons; and, clicking on at least one of said buttons to show a location and proper functional data whereby the technician can diagnose the malfunctions.

The Strategy Based Diagnostic System can be used as a diagnostic software tool for electrical/hydraulic/vacuum pneumatic systems. The system can be used on existing software platforms such as but not limited to WINDOWS®, INTERNET EXPLORER®, or NETSCAPE NAVIGATOR®.

Further objects and advantages of this invention will be apparent from the following detailed description of the presently preferred embodiments that are disclosed in the following text and properties of which are illustrated in the accompanying drawings.

BRIEF DESCRIPTION OF THE FIGURES

FIG. 1*a*, FIG. 1*b*, FIG. 1*c*, FIG. 1*d*, and FIG. 1*e* set forth a basic flowchart of the diagnostic system of the invention.

DESCRIPTION OF THE PREFERRED EMBODIMENT

Figure 1B:
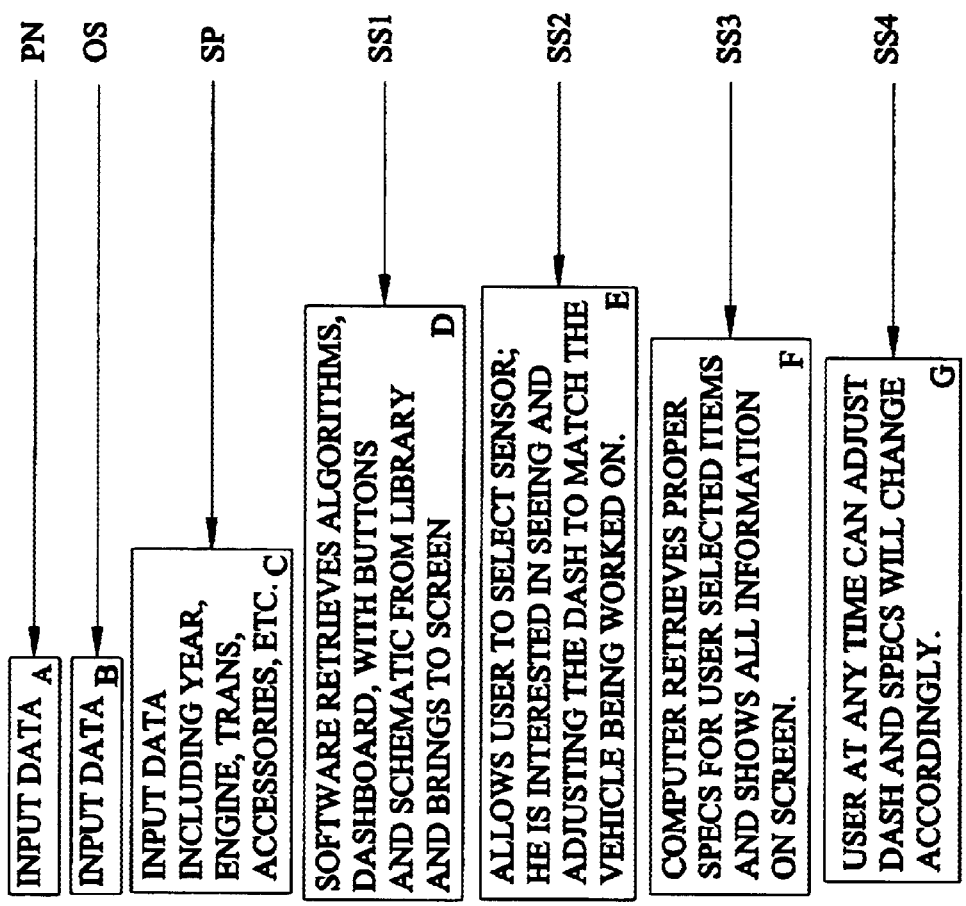
Figure 1D:
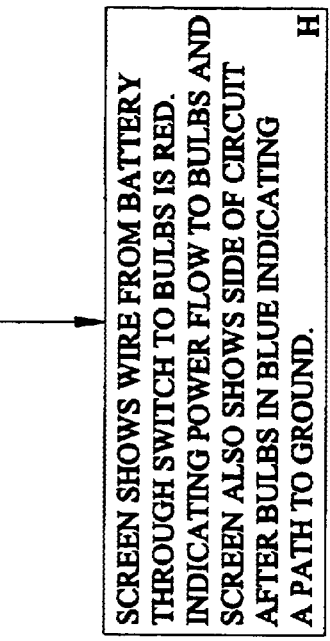
Figure 1C:
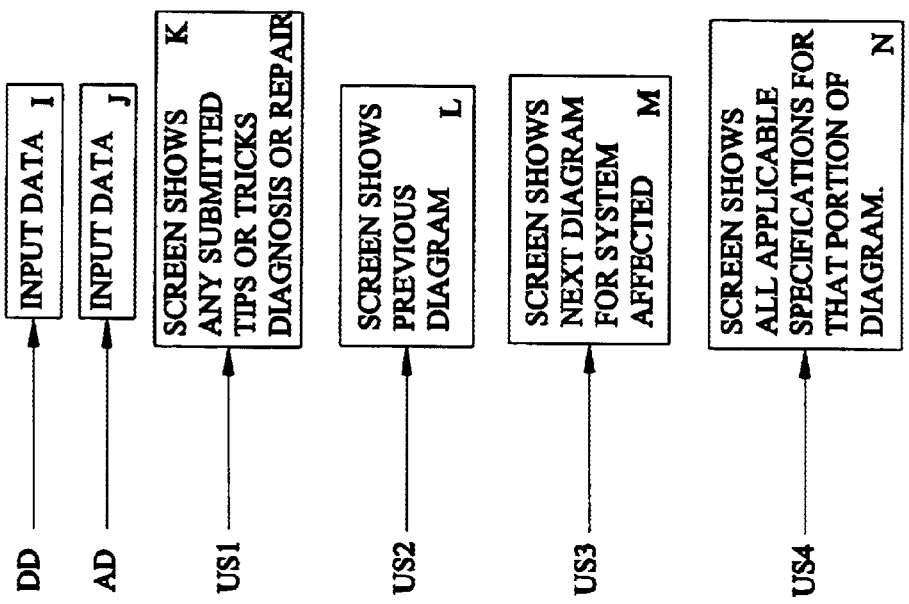

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation It is would be useful to discuss the meanings of some words used herein and their applications including:

diagnostic system—a method of withdrawing first a template from a database and thereafter retrieving a series of pages related to the diagnosis being conducted having operating data defined thereon:
  simulation capabilities—a means of retrieving operating data from a page showing circuitry by clicking a button present on said page:
    machinery—equipments useful in the automobile, hydraulic, pnuematic and vacuum businesses;
    electrical specifications—data available from an electronic database disclosing circuitry as well as operating voltages and currents at predetermined points in the circuitry and means for retrieving visual structures of the components of the circuitry;
    hydraulic specifications—data available from an electronic database disclosing the hydraulic structure of the operating system being diagnosed with means to visually extract the operating pressure at predetermined points in the structure and separate means for retrieving visual structures of the components of the system;
    pneumatic specifications—data available from an electronic database disclosing the pneumatic structure of the operating system being diagnosed with means to visually extract the operating pressures at predetermined points in the structure and separate means for retrieving visual structures of the components of the system;
    vacuum specifications—data available from an electronic database disclosing the structure of the vacuum system being diagnosed with means to visually extract the operating pressures at predetermined points in the structure and separate means for retrieving visual structures of the components of the system;
  strategy—a step by step pre-planned approach to solving a problem:
    visual—information appearing on a monitor of a machine for retrieving data which is readable by the machine operator;
    template—a page retrieved from an electronic database onto which information is entered which defines the subsequent retrieval of a dashboard with its retrievable visual specifications;
    dashboard—page structure obtained from an electronic database from which specifications determined by the initially entered information can be retrieved by clicking on a button; and,
    button—a visual structure appearing on the dashboard which when clicked will provide a visual specification.

The buttons designated "L, S, D, C, P, I, N and TT" are further defined and illustrated in the text describing FIGS. 5 through 10 and also referred to in FIGS. 12 through 23.

The invention can be characterized as a Strategy Based Diagnostic System (hereinafter SBDS) which is a "connect the dots" visual strategy based system with simulation capabilities which can be used with all sorts of products including automobiles, aeronautics, boats and dishwashers.

Now that all the nomenclature has been defined for the purposes of this disclosure, it would be useful to refer now to the self explanatory basic SBDS flowchart of FIG. 1a and FIG. 1b and study it carefully since doing so will facilitate understanding of the hereafter set forth Examples.

EXAMPLE 1

Figure 2:
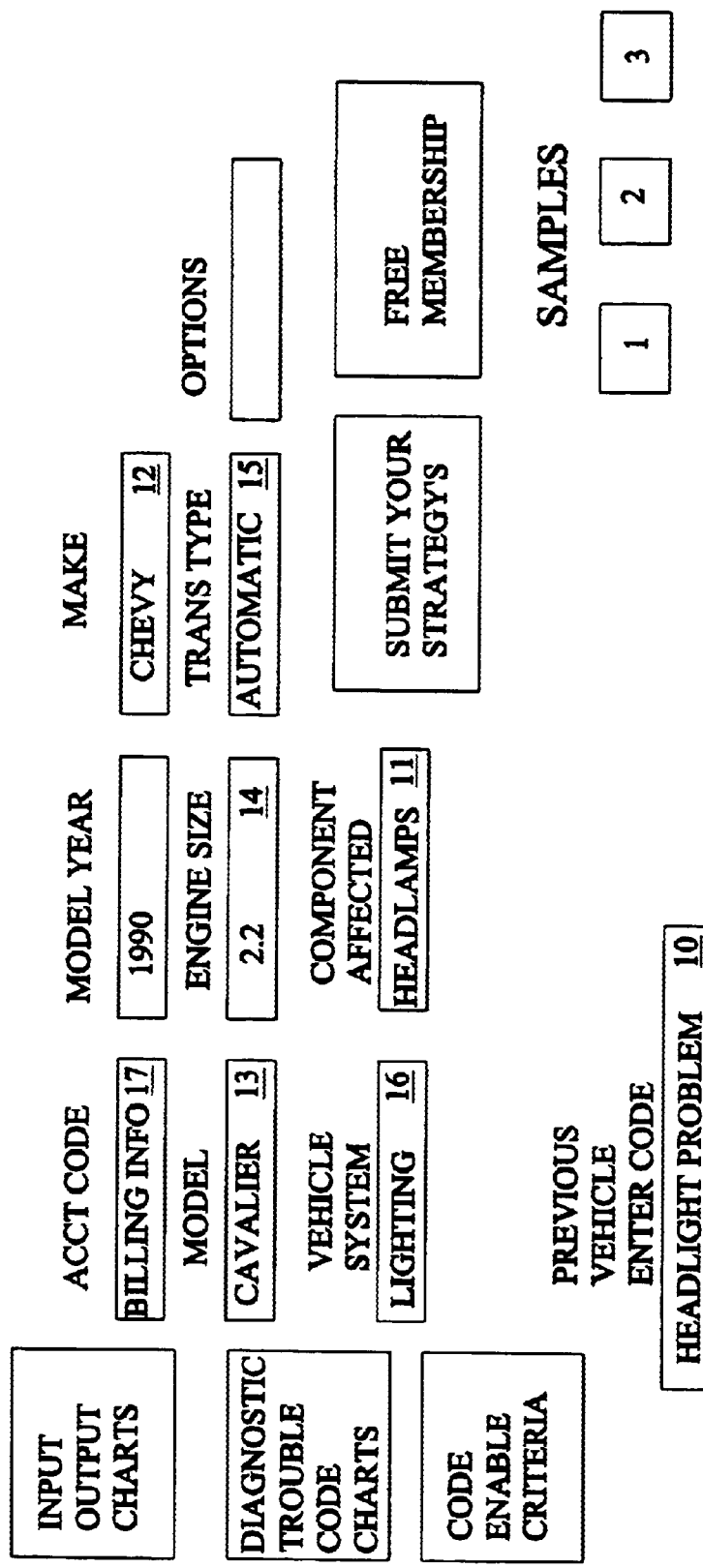
FIG. 2 shows a representation of an initial template identifying both the problem to be diagnosed and the equipment in which it is found.

After the technician turns on the CD-Rom containing the SBDS or derives it from the Internet the first image appearing will be the page pictured in FIG. 2. In initiating the diagnosis, data must be entered into the template from the first portion of the database which identifies both the problem to be diagnosed and the equipment in which it is found. This then enables the technician, to withdraw from the second portion of the database a series of screens which have buttons that he can then click for information setting forth the correct operating parameters and location of the desired component.

The data entered into FIG. 2 shows that headlight problem to be diagnosed is entered onto the screen 10 into the space 11 below COMPONENT AFFECTED as headlamp. In space 12 below MAKE, the auto is identified a Chevy Cavalier {space 13 below MODEL} 2.2 L {space 14 below ENGINE SIZE} with an automatic transmission {space 15 below TRANS. TYPE}. An entry in space 16 below the Vehicle System facilitates the withdrawal of headlamp dashboard from the appropriate database. For billing information, the space 16 below ACCTCODE can be used.

Figure 3:
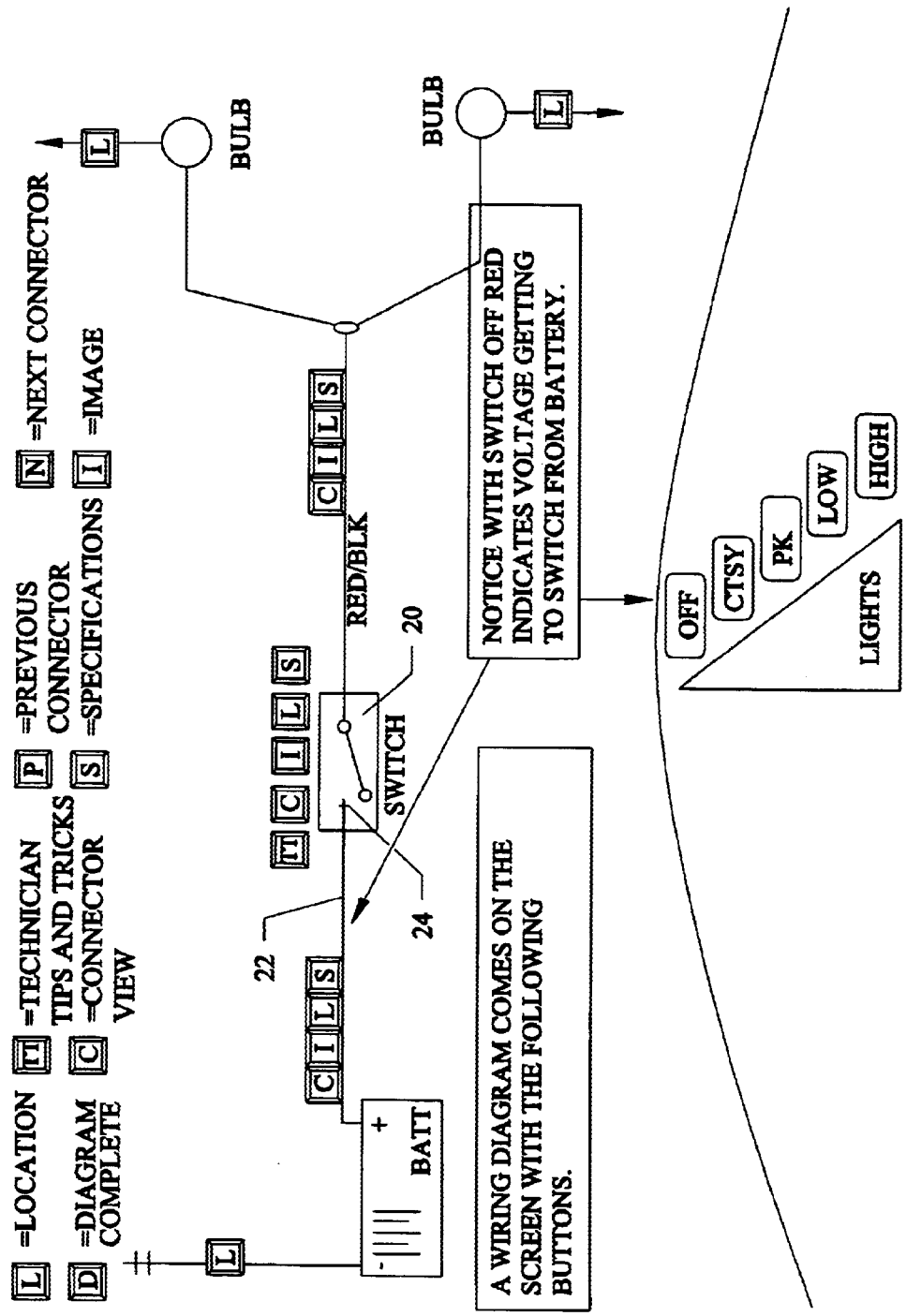
FIG. 3 shows a representation of the screen showing the headlamps wiring diagram with an open switch and identification buttons.
Figure 4:
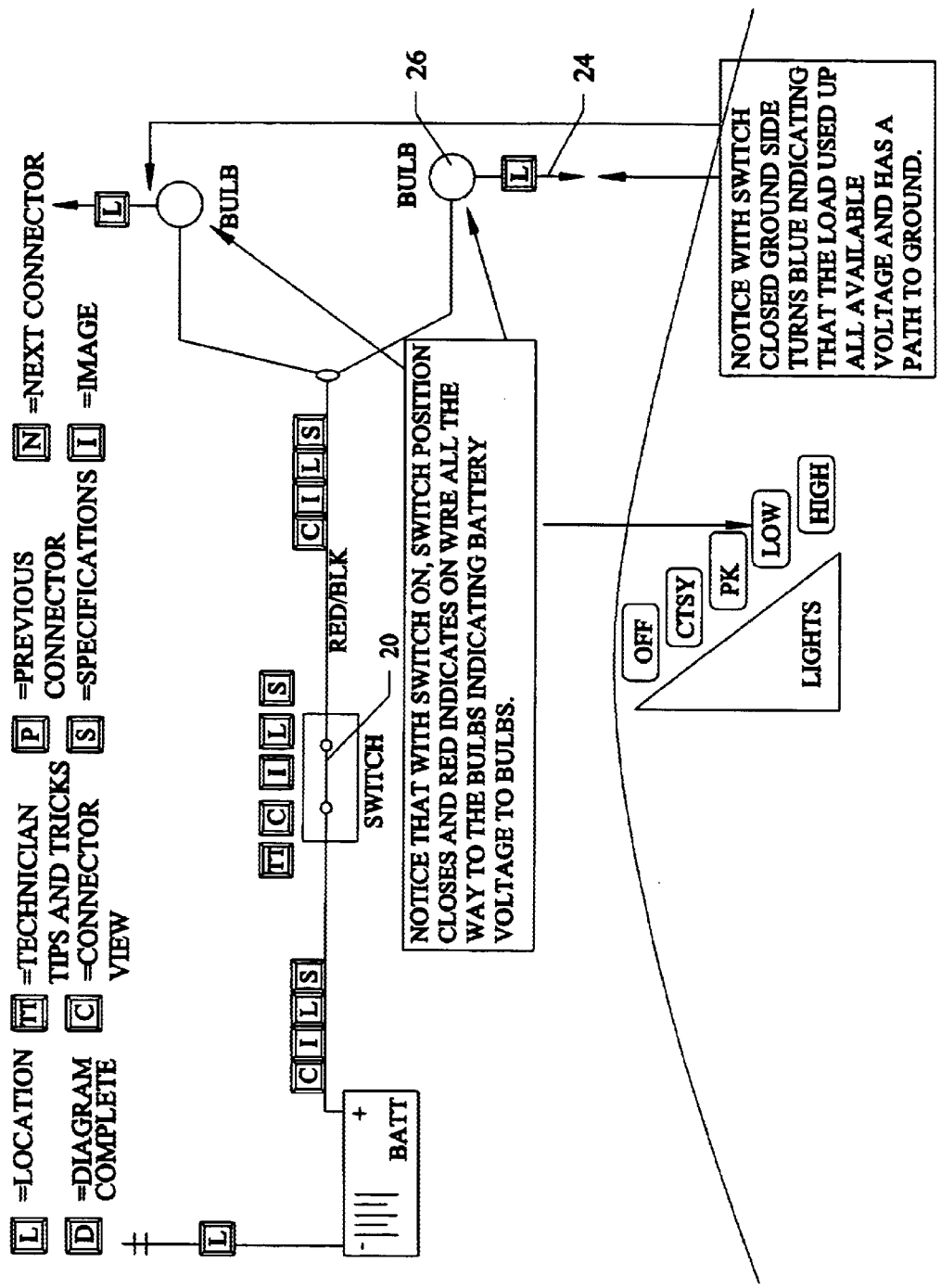
FIG. 4 shows the diagram of FIG. 3 with a closed switch.

FIG. 3 is a representation of the circuit diagram that appears on the screen showing the headlamp wiring diagram with the earlier described buttons. In this diagram, the switch 20 is open and the color red of wire 22 leading to contact 24 which upon voltage measurement shows the specified voltage of 12. Thus the problem is further along in the wiring circuit. Retrieval of the next diagram by checking on (N) (next connector) has the switch 20 closed as seen in FIG. 4 with battery voltage (shown as a red indication on the wires running from the battery to the bulbs) extending all the way to the bulbs. Also seen in the diagram of FIG. 4, is a blue color of the ground side 24 of the bulb 26 indicating a short to ground of the car which has thus provided a diagnosis of the headlamp problem. To go from FIG. 4 to FIG. 3, click on (P) (previous connector)

Figure 5:
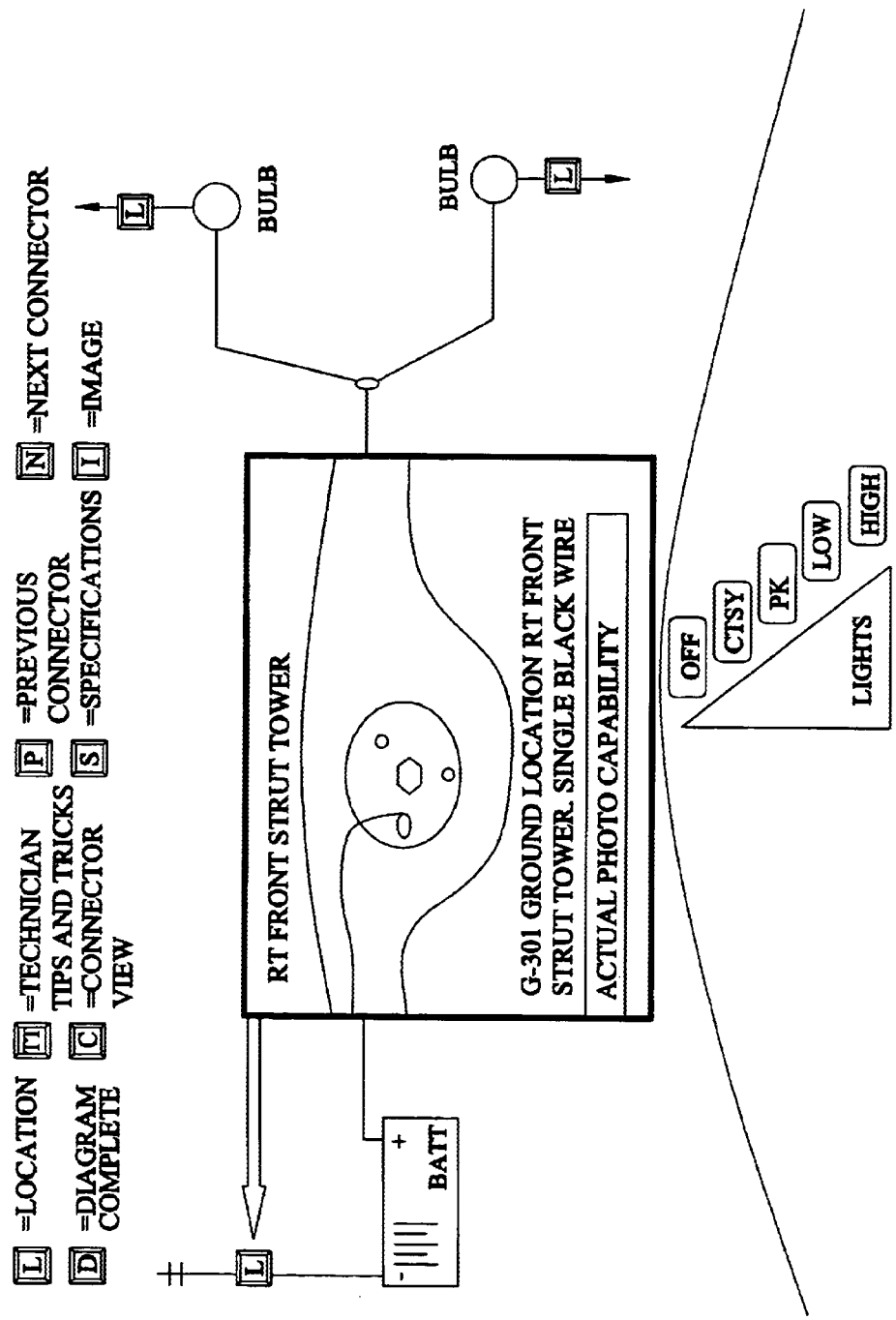
FIG. 5 illustrates the result of clicking on the location (L) button.

In FIG. 5, there is an illustration of what happens when one clicks on a location (L) and clicking on it opens a window from the library that shows the location and a picture, drawing, photo or similar representation of the location.

Figure 6:
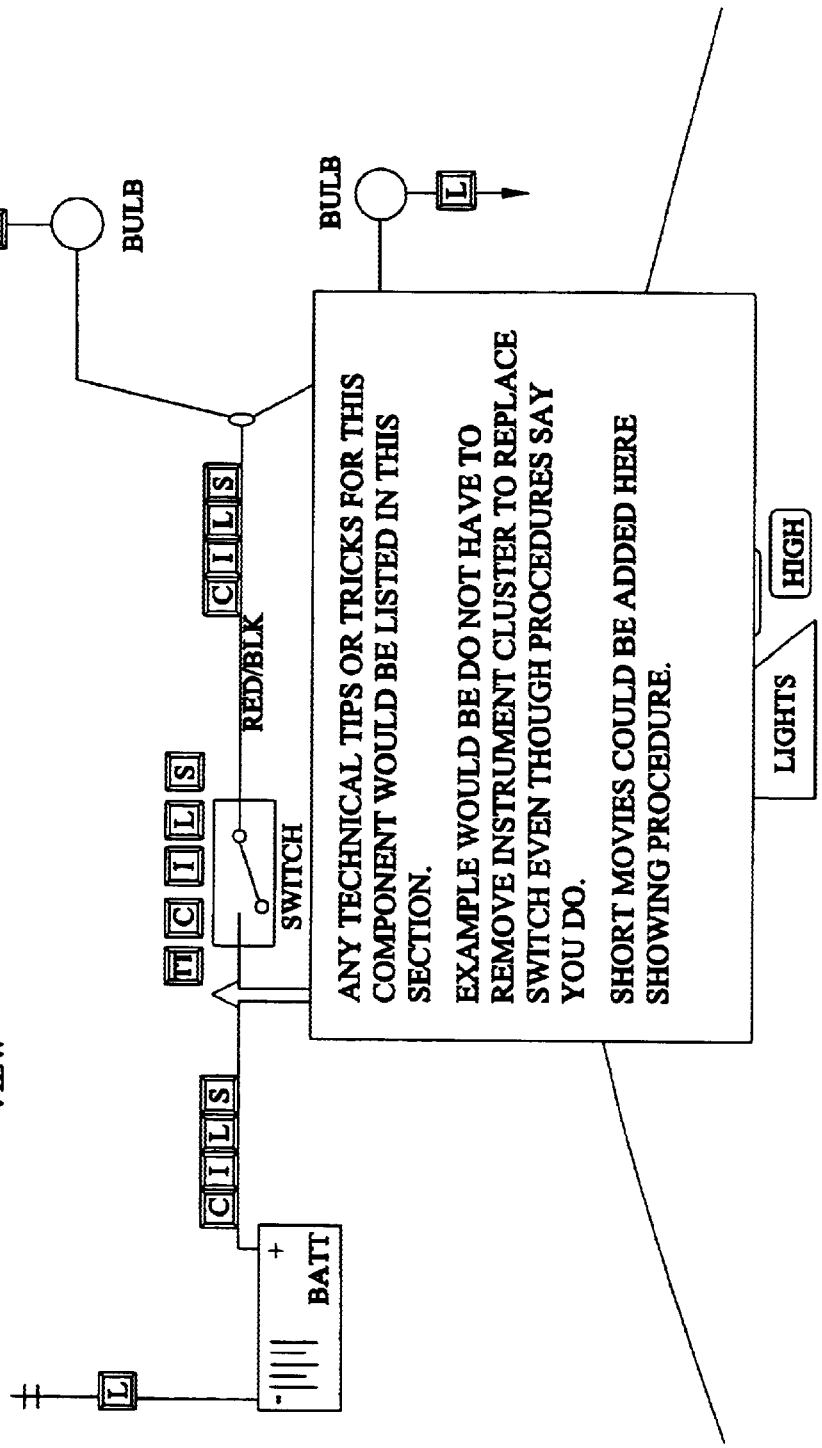
FIG. 6 illustrates the result of clicking on the Technician Tip and Tricks (TT) button.

In FIG. 6, there is an illustration of what happens when one clicks on a Technician Tips and Tricks button (TT). It opens a window with technicians' tips and tricks as might have been previously encountered with various diagnoses at this particular section. An example of this would be that one doesn't have to remove the instrument panel (as stated by the manual) in order to replace the switch. Movies of procedures could be shown. It can be made to accept additional tricks from later sources.

Figure 7:
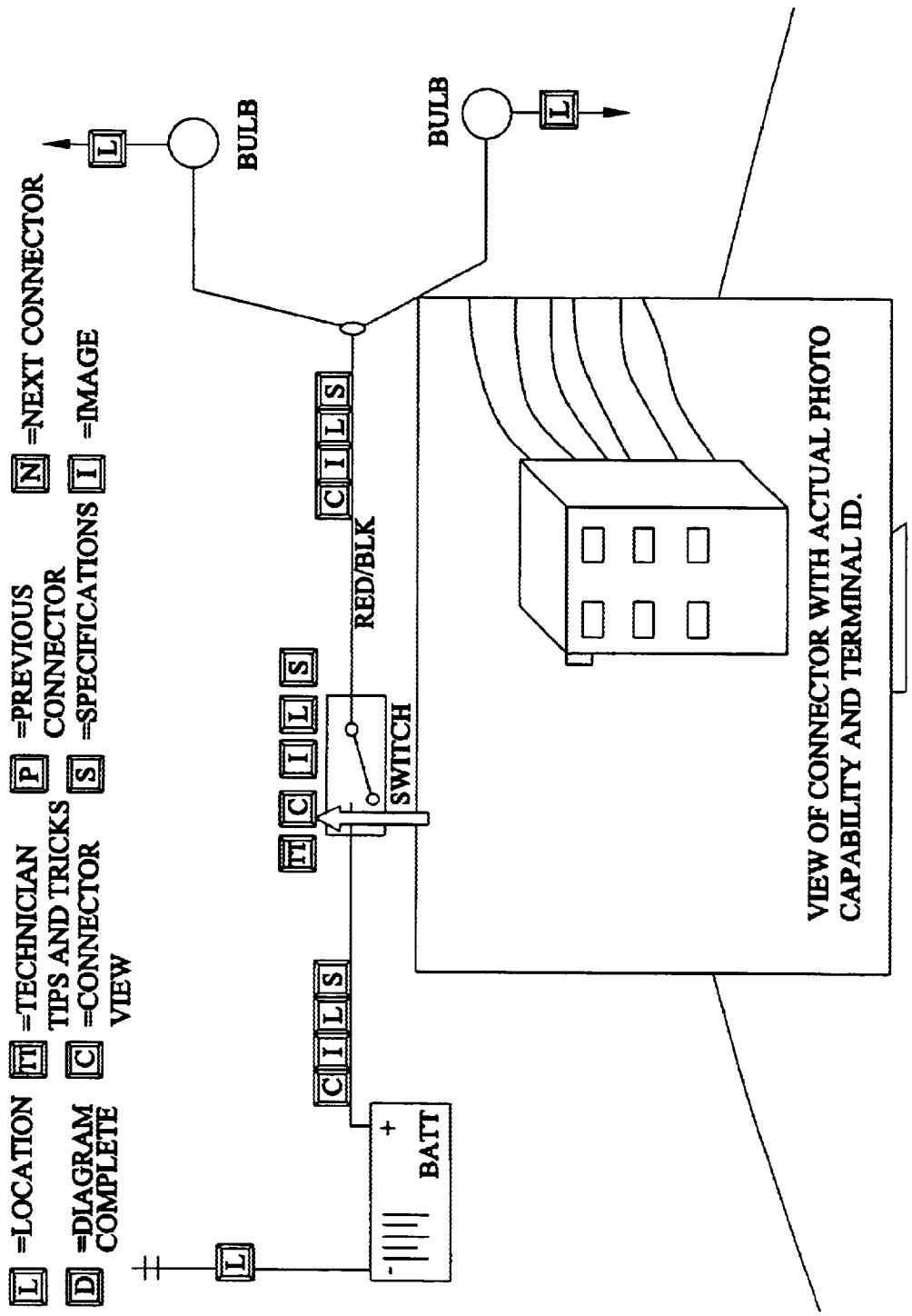
FIG. 7 illustrates the result of clicking on the Connector View (C button

In FIG. 7, there is an illustration of what happens when one clicks on a Connector View (C) button. The result will be a picture of the electrical connector for the item selected with actual photo capability and terminal identifications.

Figure 8:
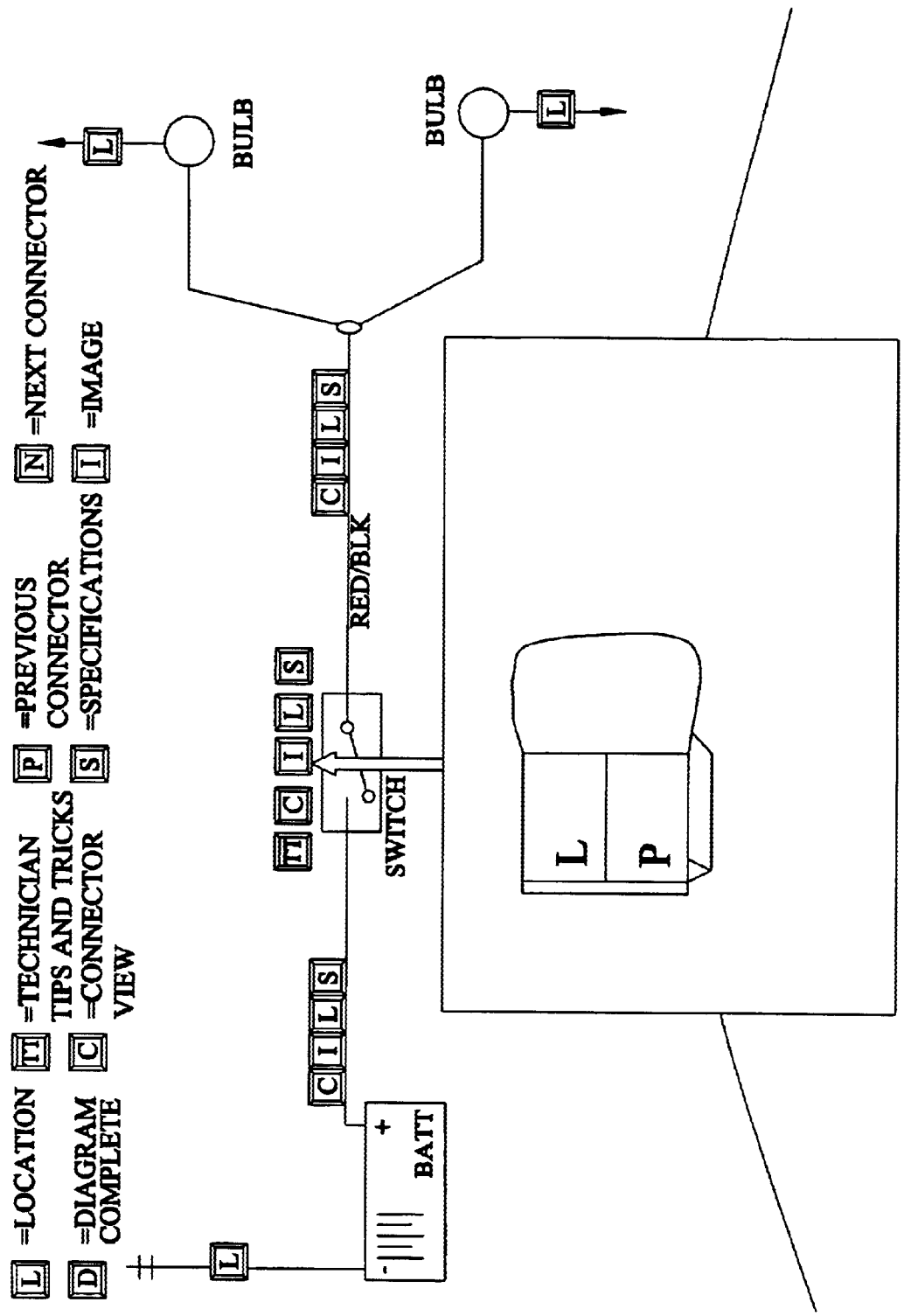
FIG. 8 illustrates the result of clicking on the Image (I) button.

In FIG. 8, there is an illustration of what happens when one clicks on an Image (I) button.

The result will be a picture of the actual component for the item selected with actual photo capability and terminal identifications.

Figure 9:
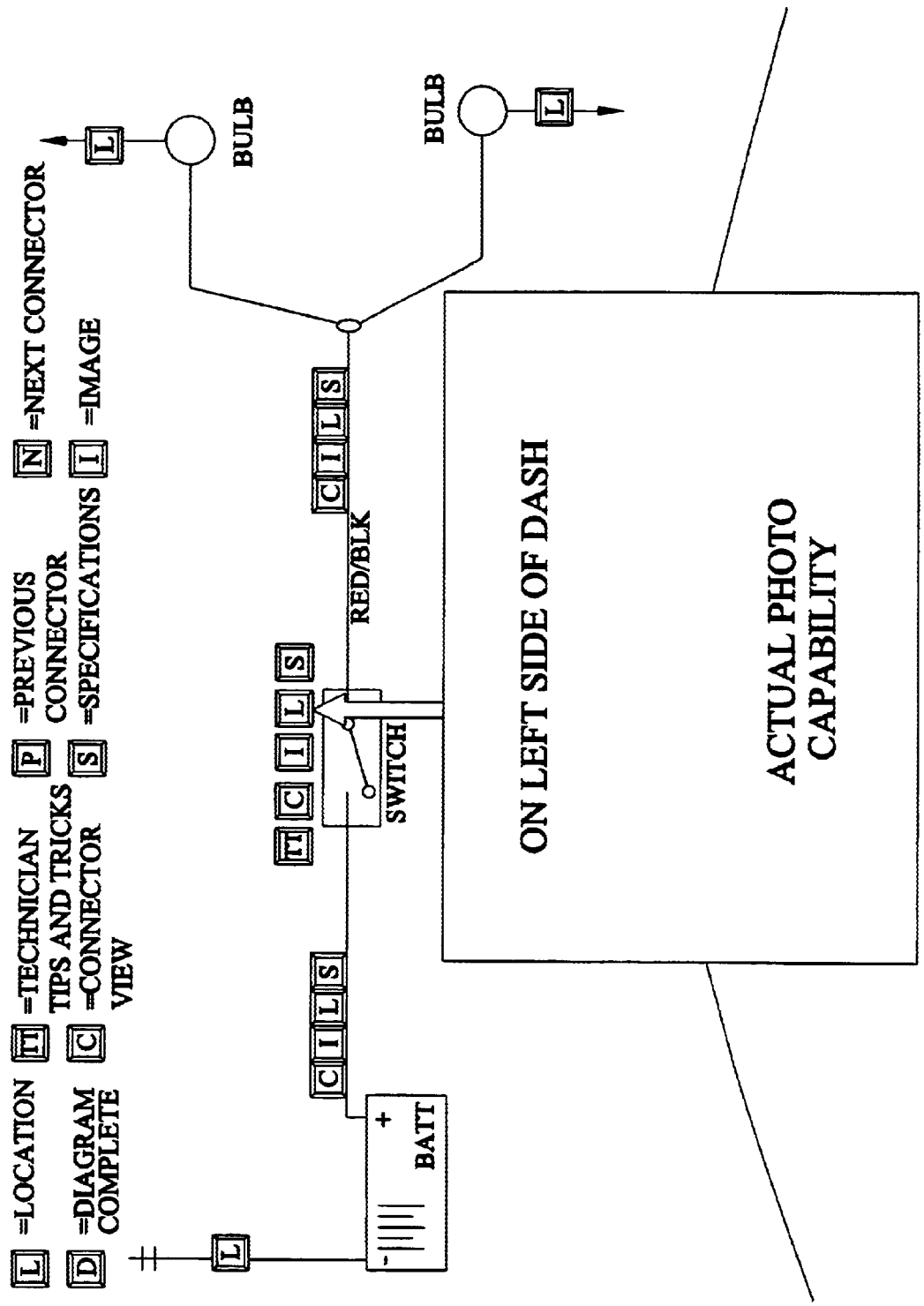
FIG. 9 illustrates the result of clicking on the Location (L) button.

In FIG. 9, there is another illustration of what happens when one clicks on a Location (L) button. The result can be a picture of the actual component for the item selected with a description of it with further data of its actual location and other relevant information.

Figure 10:
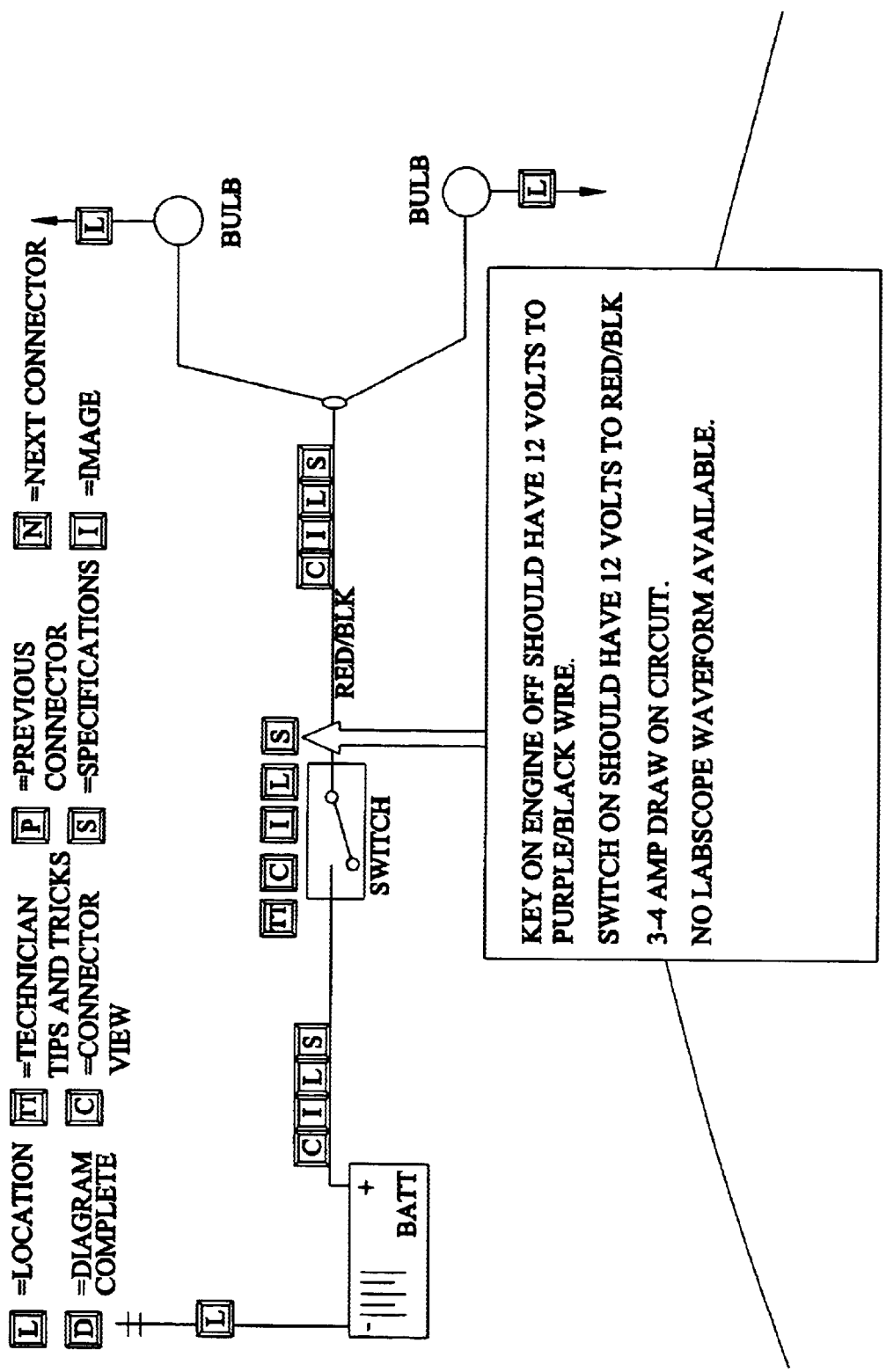
FIG. 10 illustrates the result of clicking on the Specifications (S) button.

In FIG. 10, there is an illustration of what happens when one clicks on a Specifications (S) button The resulting of opening the window can provide for visual disclosure and/or printout of all proper voltages and their related points for measuring as well as proper current flow.

EXAMPLE 2

Figure 11:
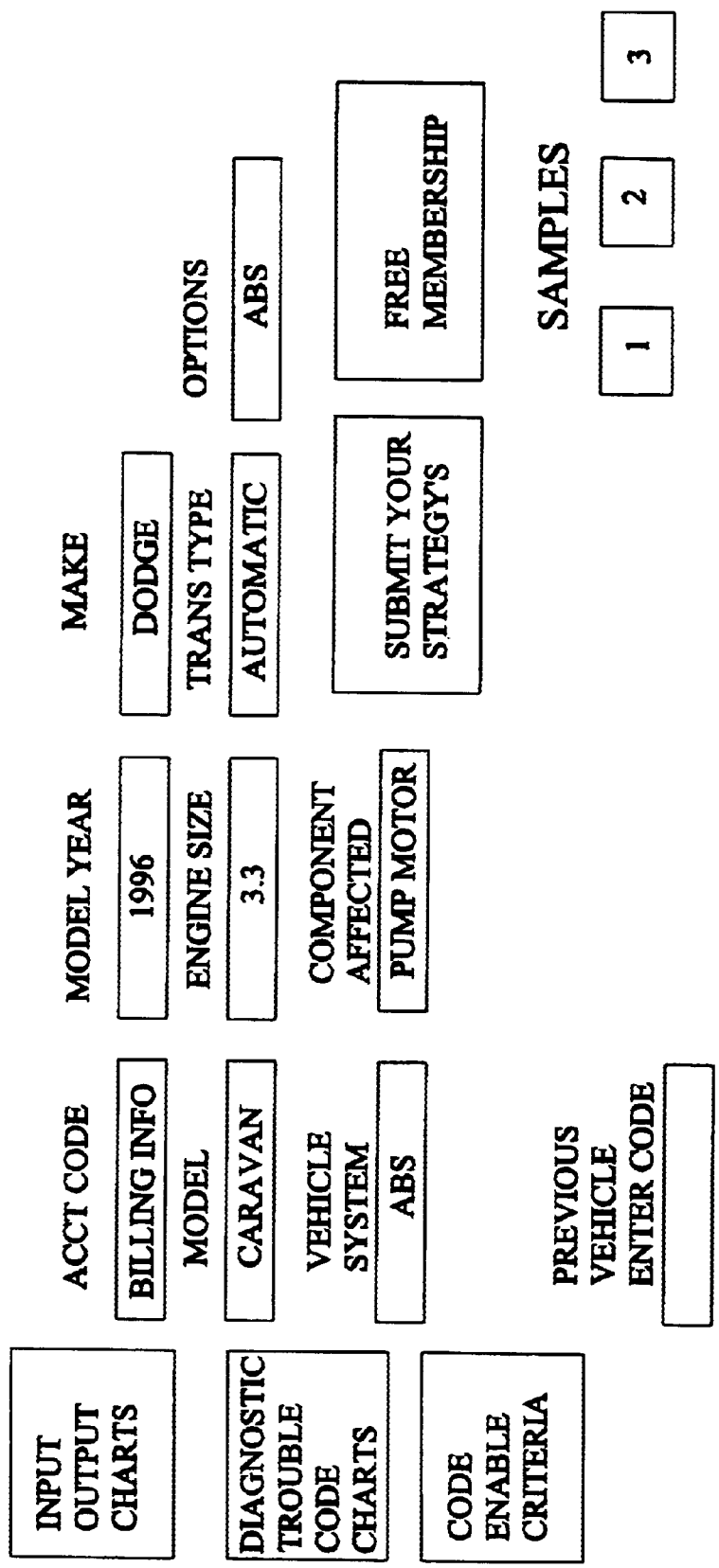
FIG. 11 shows a second representation of an initial template identifying both the problem to be diagnosed and the equipment in which it is found.
Figure 12:
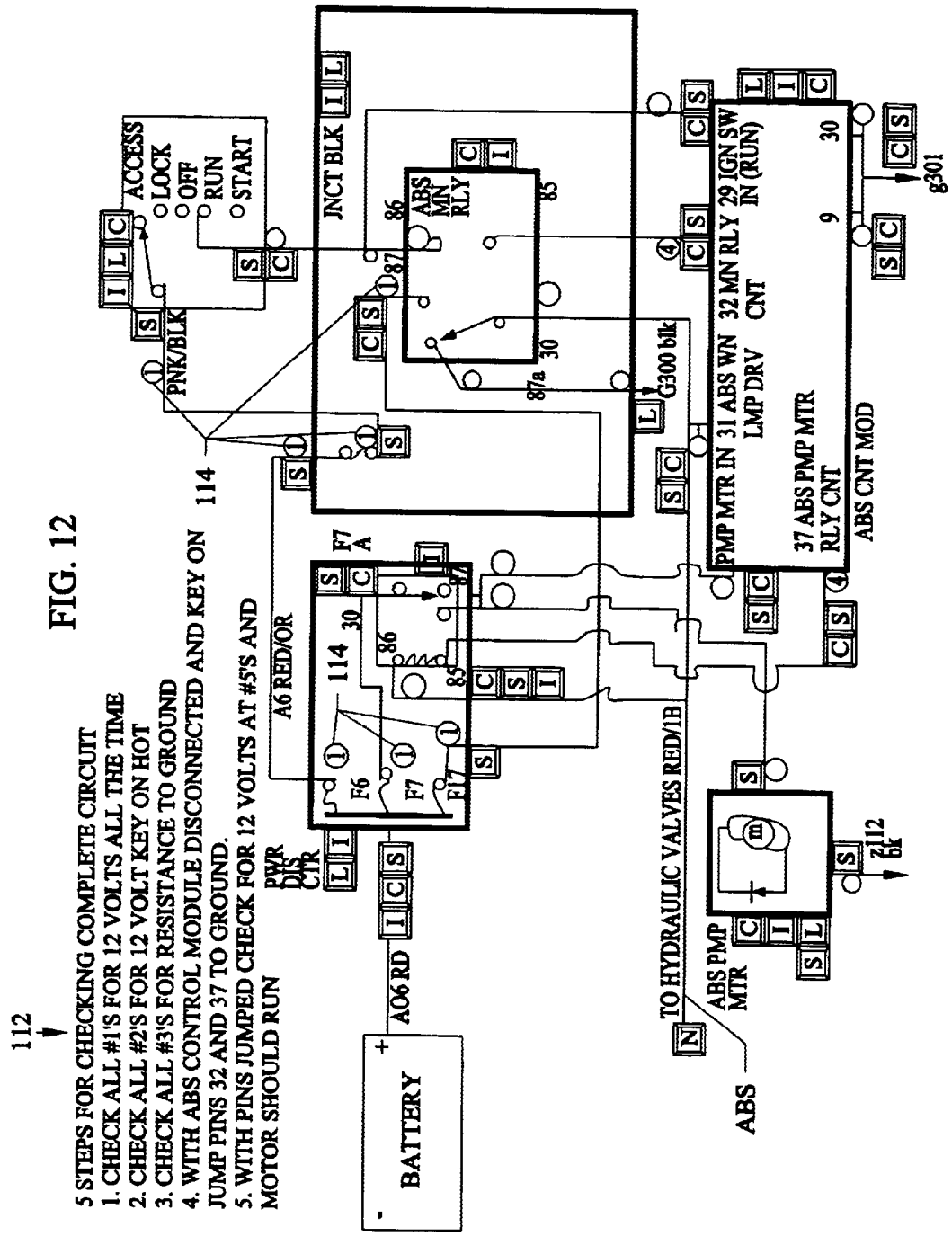
FIG. 12 shows the video representation of the screen showing the pump motor wiring diagram with the unique buttons
Figure 13:
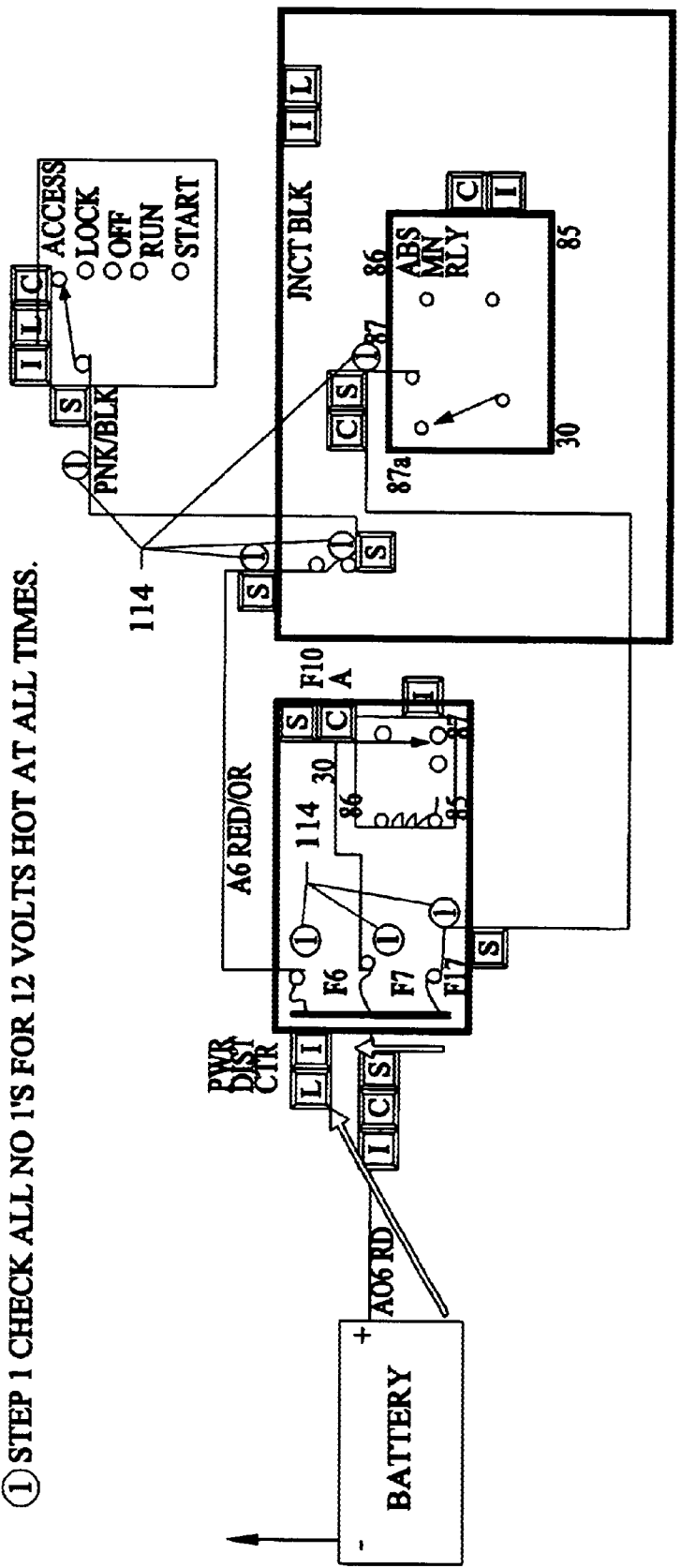
FIG. 13 shows a picture of the area or location of portions of circuits when clicking the (C) or (L) buttons.
Figure 14:
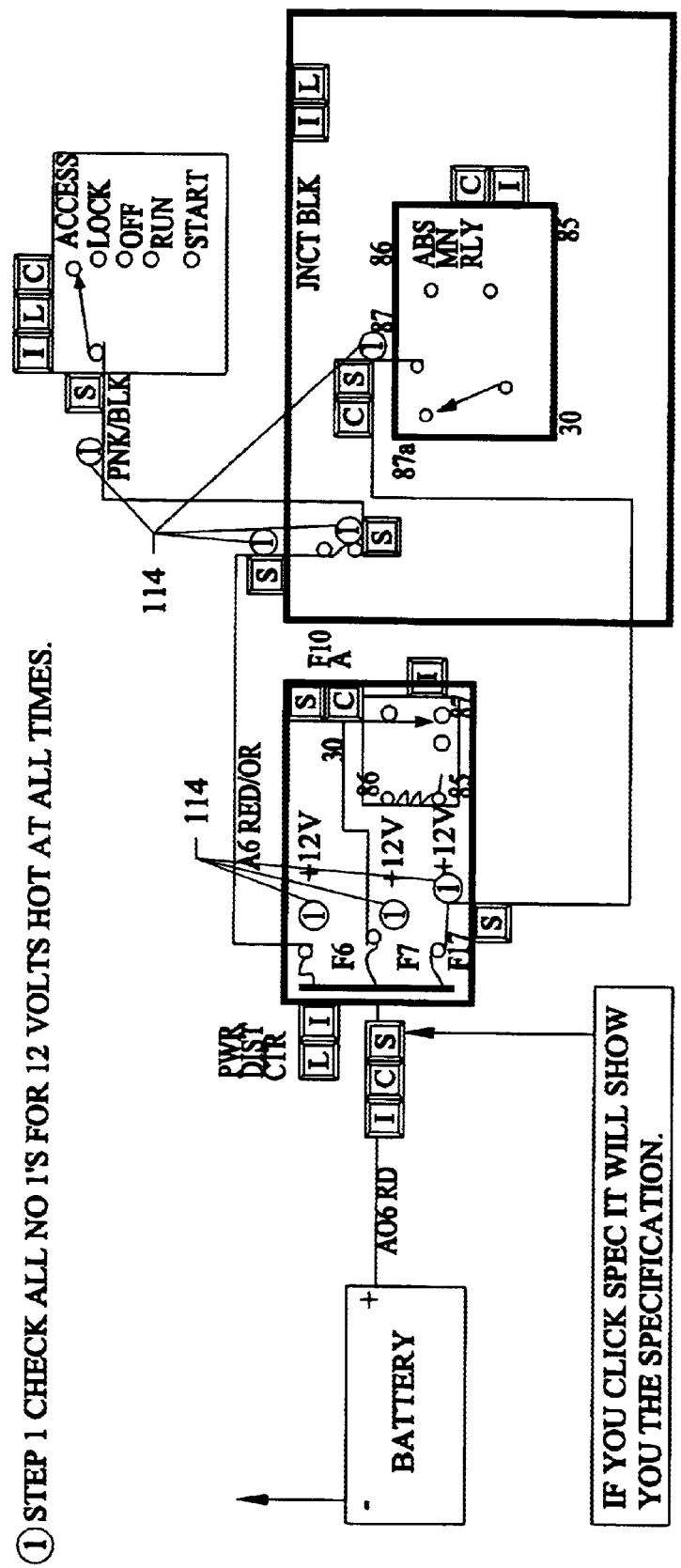
FIG. 14 shows if you click any (S) button it gives you the specifications of that portion of that circuit.
Figure 15:
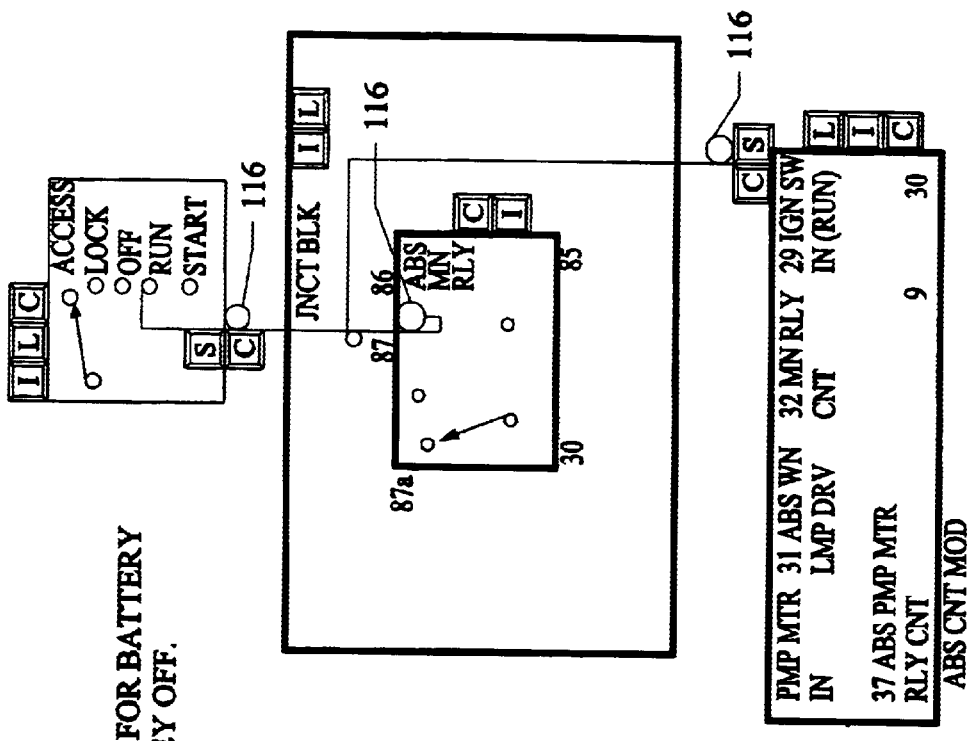
FIG. 15 shows the video representation of the screen showing a portion of the schematic of FIG. 12.
Figure 16:
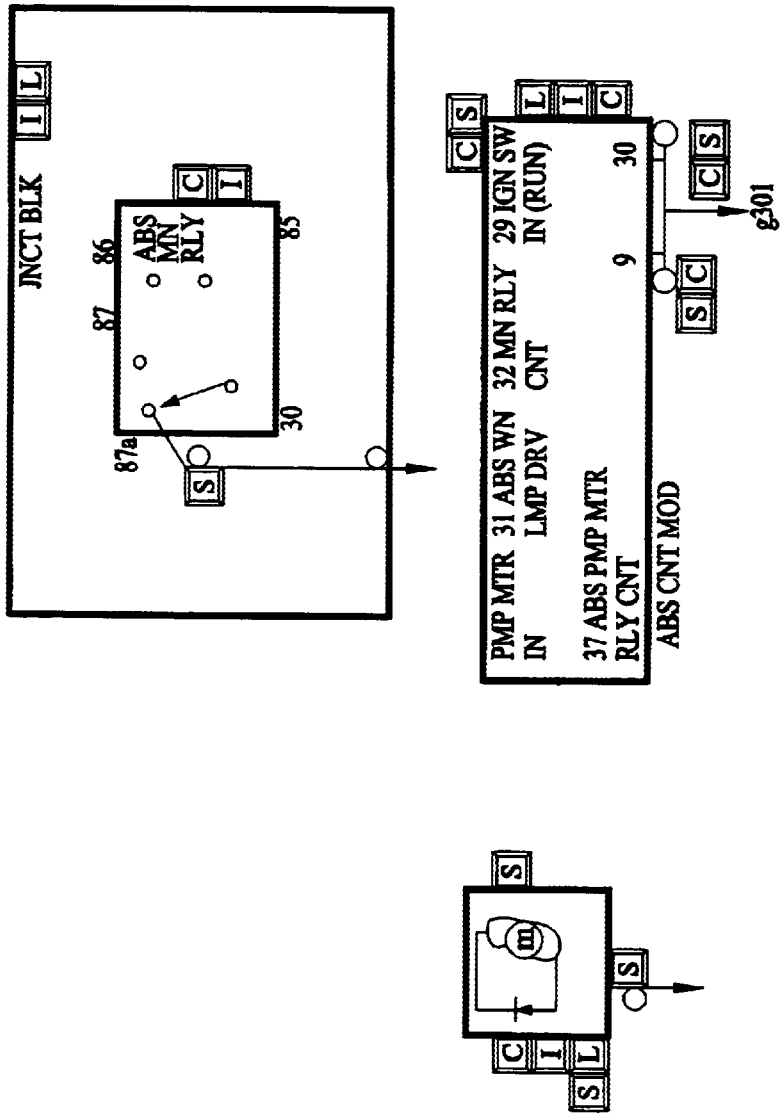
FIG. 16 shows the video representation of the screen showing a lesser portion of the schematic of FIG. 15.
Figure 17:
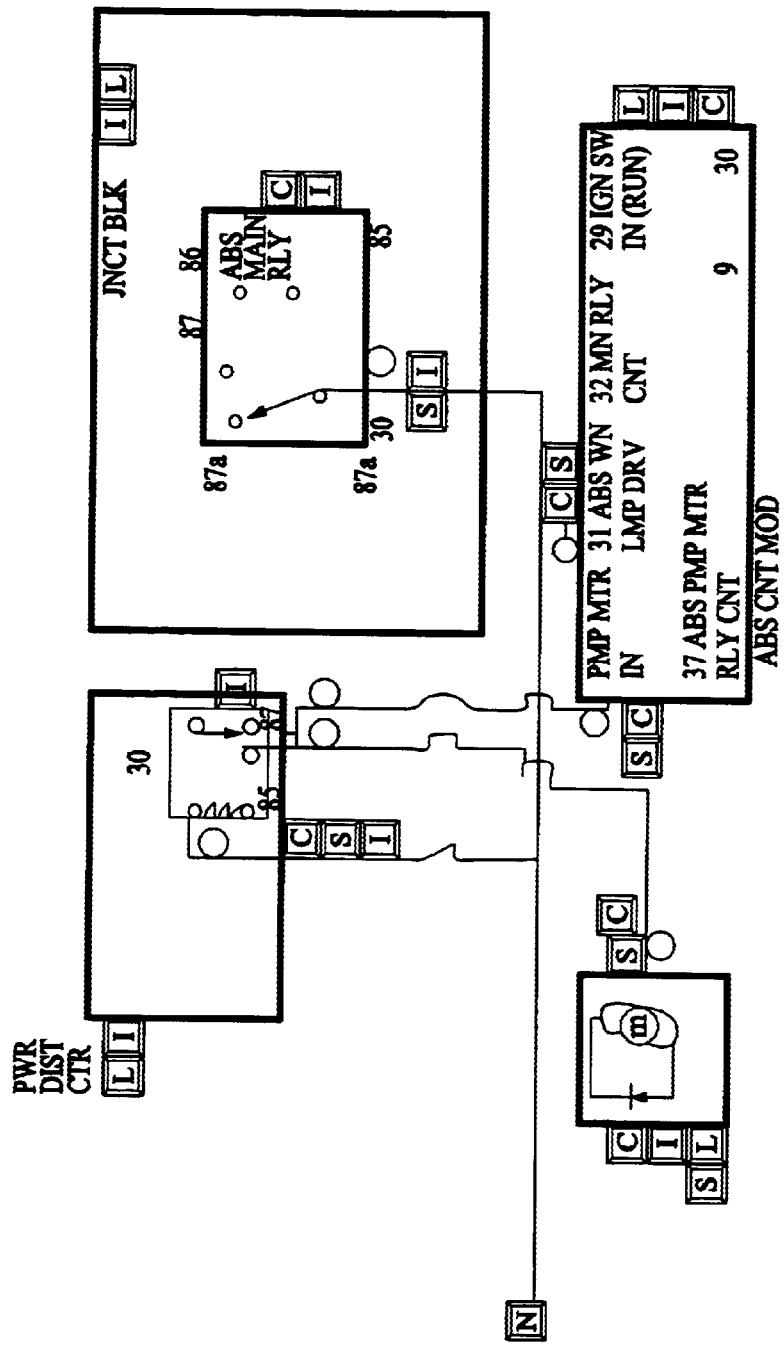
FIG. 17 shows the video representation of the screen showing the pump motor wiring diagram with the buttons and instructions of how to test the motor to see if it would run.
Figure 18A:
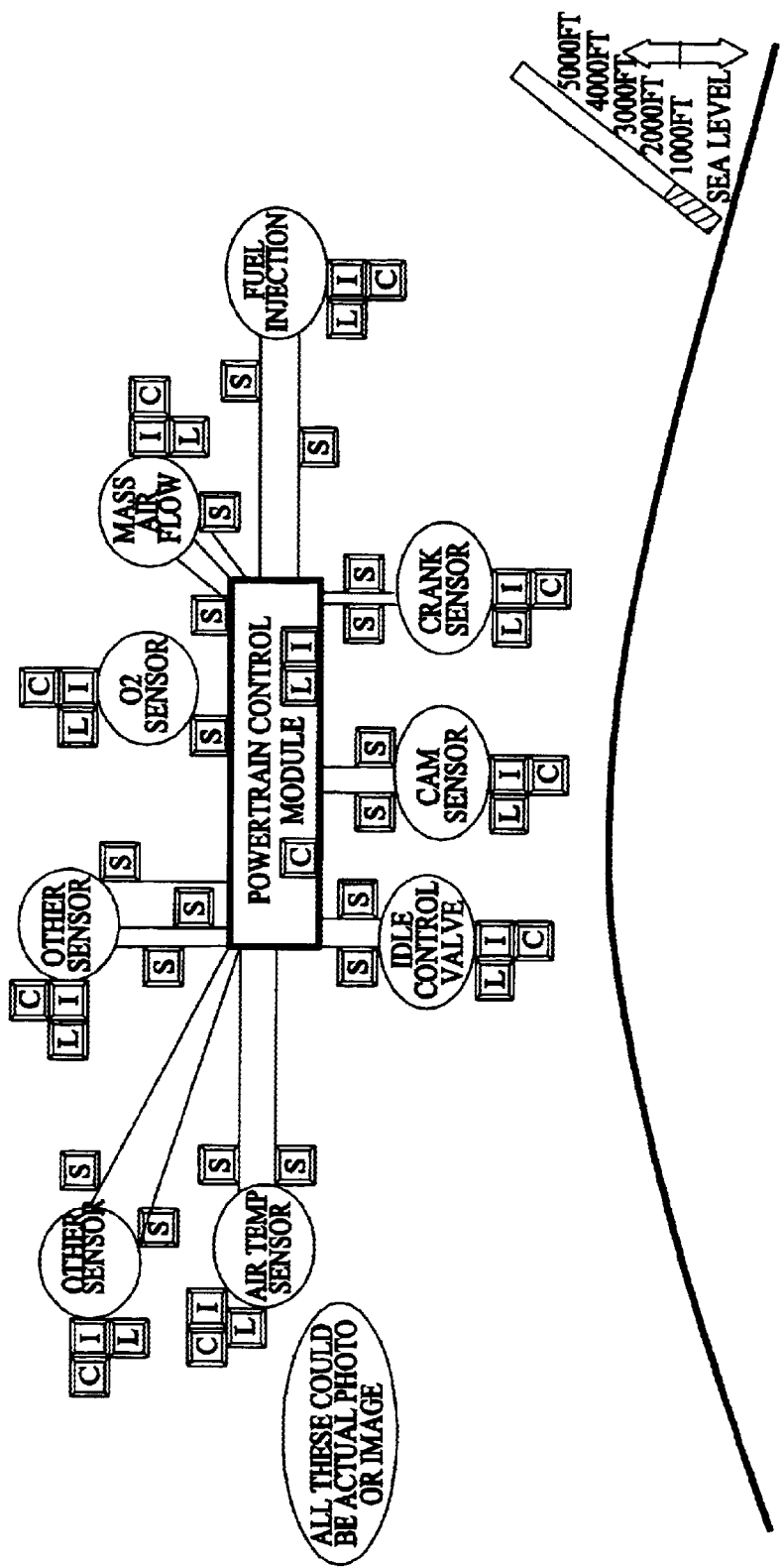
FIGS. 18a and 18b illustrates the video presentation of a powertrain control module and the simulation dashboard.
Figure 18B:
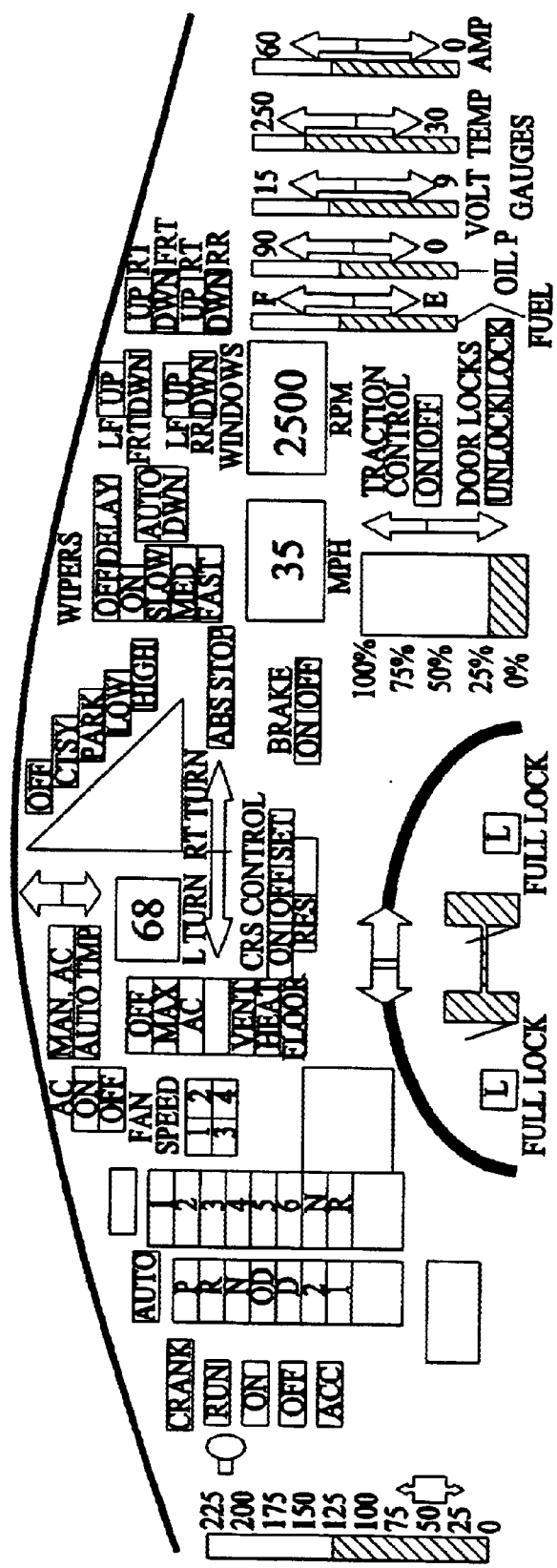

In this example, the SBDS is initiated by retrieving the page shown in FIG. 2: however, the vehicle to be diagnosed is a 1996 Dodge Caravan having a 3.3L engine with automatic transmission and ABS braking system. The problem is with a pump motor for the above automobile as is illustrated the completed page of FIG. 11. The first diagnosis screen retrieved is the complete electrical circuit of the pump motor shown as FIG. 12 with testing directions 112 printed on the screen. Each spot on the screen numbered (1) (identified as 114) should measure 12 volts. Should it be difficult to find one or more of the spots, a click both on the L and the I will provide a detailed picture of the spot as seen in FIG. 13. A click on S will show that the specification voltage of all ones also identified by 114 should be +12 v as illustrated in FIG. 14. The technician thus measures all of the numbered (1) for the specified voltage. Assuming that all are correct, the next screen (shown as FIG. 15) is secured on the monitor which requests that all number (2)s (identified as 116) be checked for battery voltage with the key on engine off. When the technician finds all is satisfactory, he retrieves the next screen (shown as FIG. 16) which requests him to measure the resistance to ground (in ohms) of all points marked (3) (identified as 118). Clicking on the S nearest each (3) will advise as to the proper resistance. Subsequent retrieved screen(s) as exemplified by FIG. 17 teaches that the abs control harness should be disconnected and key on; after which the pins 32 and 37 are grounded; and, one checks for battery voltage at number (5) (identified as 120 on the FIG. 17). If the measured voltage is +12 v, the motor should run.

EXAMPLE 3

The first two examples illustrate how one can diagnose an automobile malfunction by:
(a) retrieving a page onto which one introduces the product information and its problem requiring repair;
(b) thereafter retrieving the appropriate schematic with buttons from the stored library provoked by the introductions to page referred to in step (a); and,
(c) allowing the technician to click on various buttons on the monitor, said buttons having links to the stored library for the necessary information to diagnose the malfunction.

In this Example 3, a vehicular simulation diagnosis system will be taught. The value of the simulation is that many times the technician does not have available properly operating vehicle to compare with the malfunctioning vehicle, which in this case is a powertrain management problem. Having selected to retrieve "powertrain management" from the library, the technician will see FIG. 18 on the monitor in which the upper half is (as noted thereon) powertrain control module with the various buttons earlier defined by letter and the lower half shows a dashboard (unique to this disclosure) enabling the technician to work all the systems he might need. Its utility will be come apparent as the discussion continues.

Figure 19A:
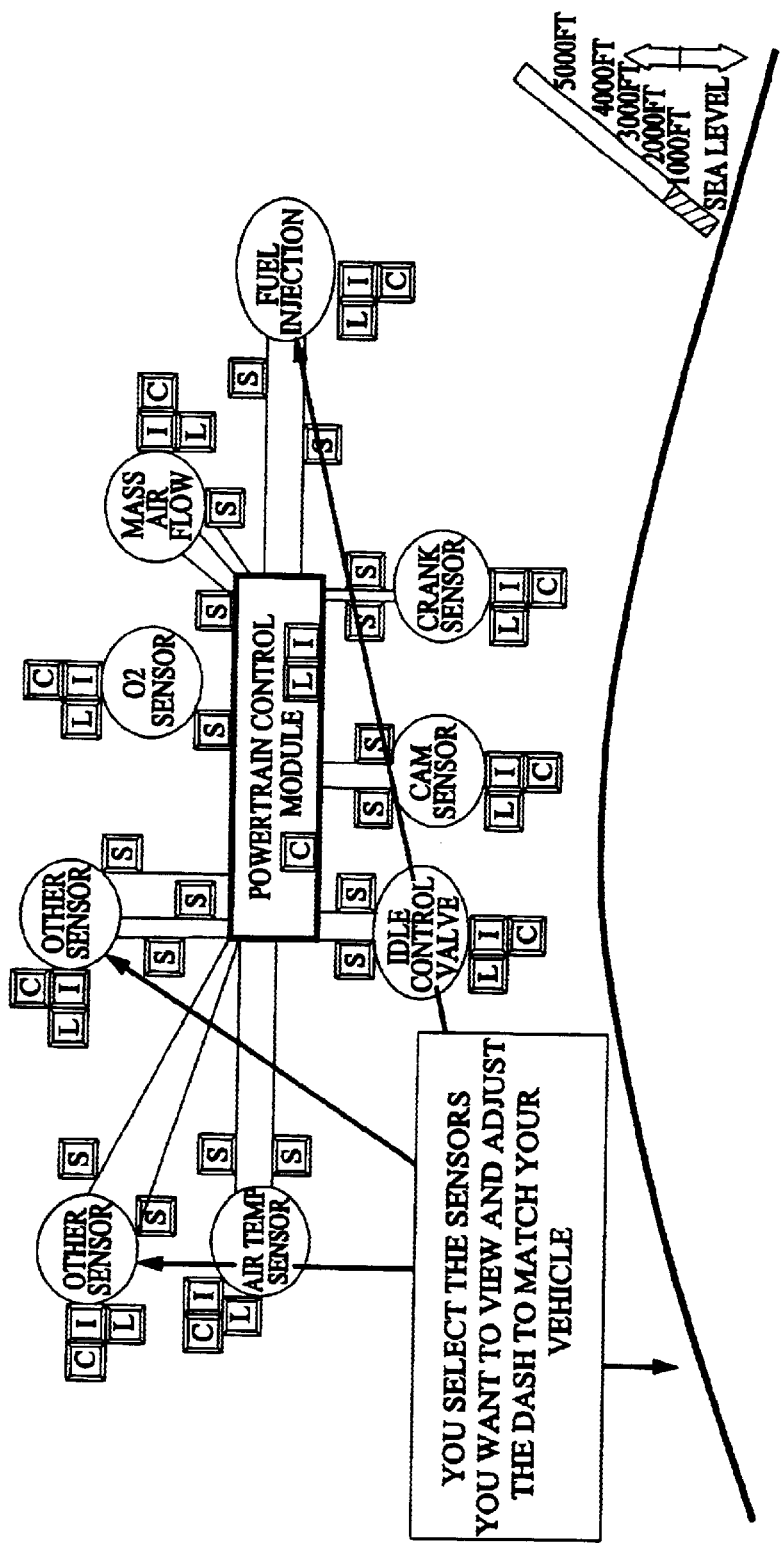
FIGS. 19a and 19b illustrates the video presentation of sensor selection and dashboard adjustment.
Figure 19B:
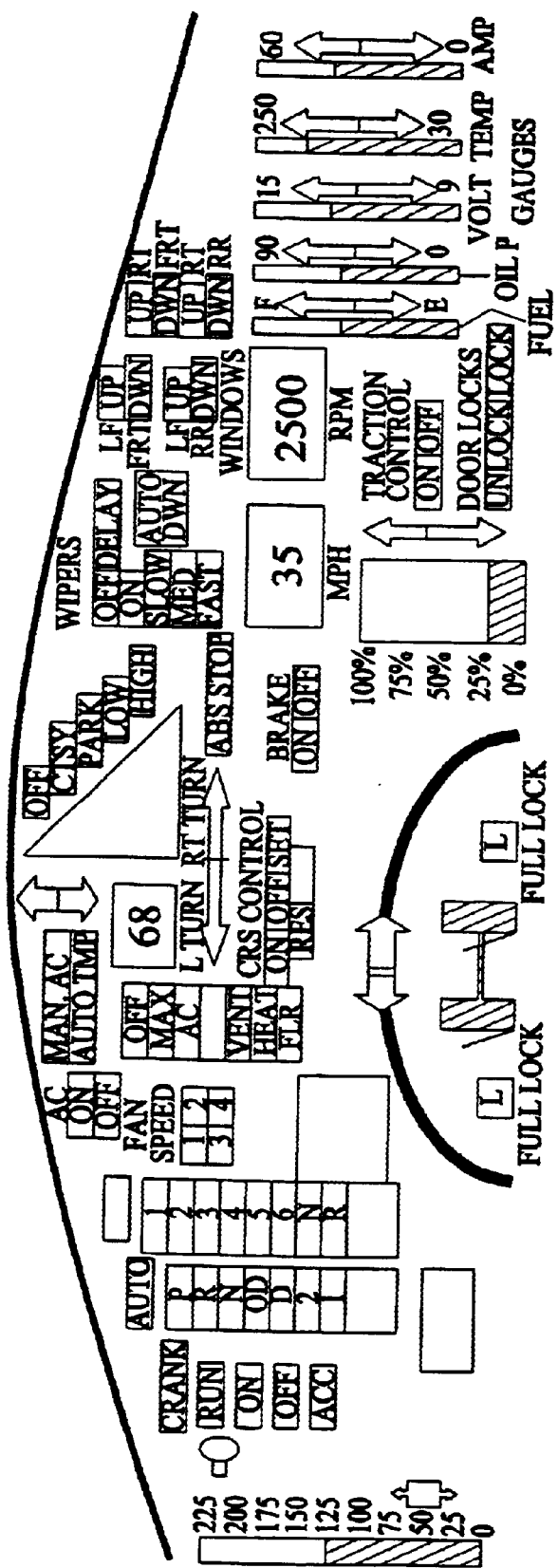
Figure 20A:
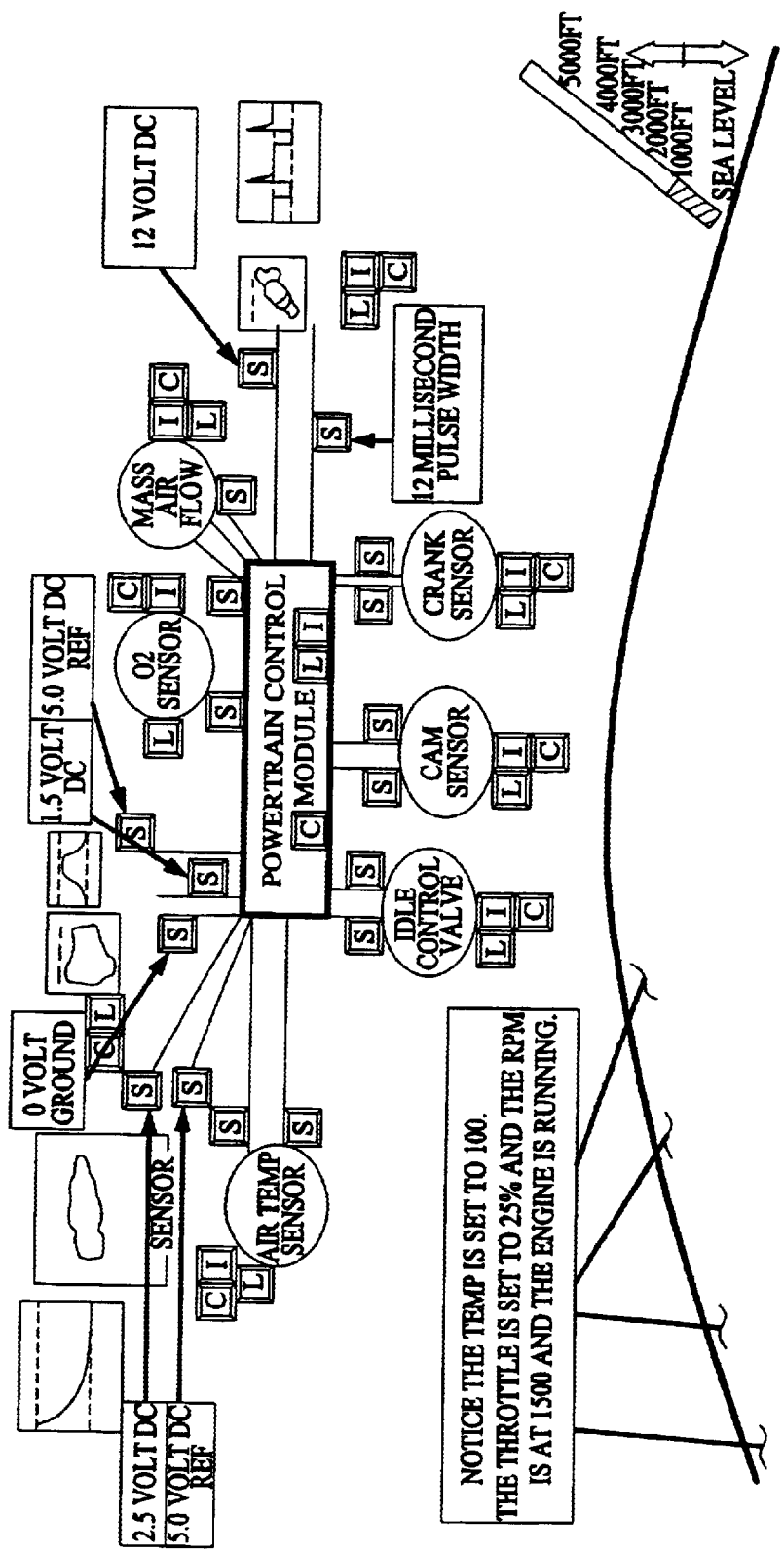
FIGS. 20a and 20b, FIG. 21a and FIG. 21b, FIG. 22a and FIG. 22b and FIG. 23a and FIG. 23b illustrate the video presentations of sensor specification changes directly responsive to changes in simulated dashboard conditions.
Figure 20B:
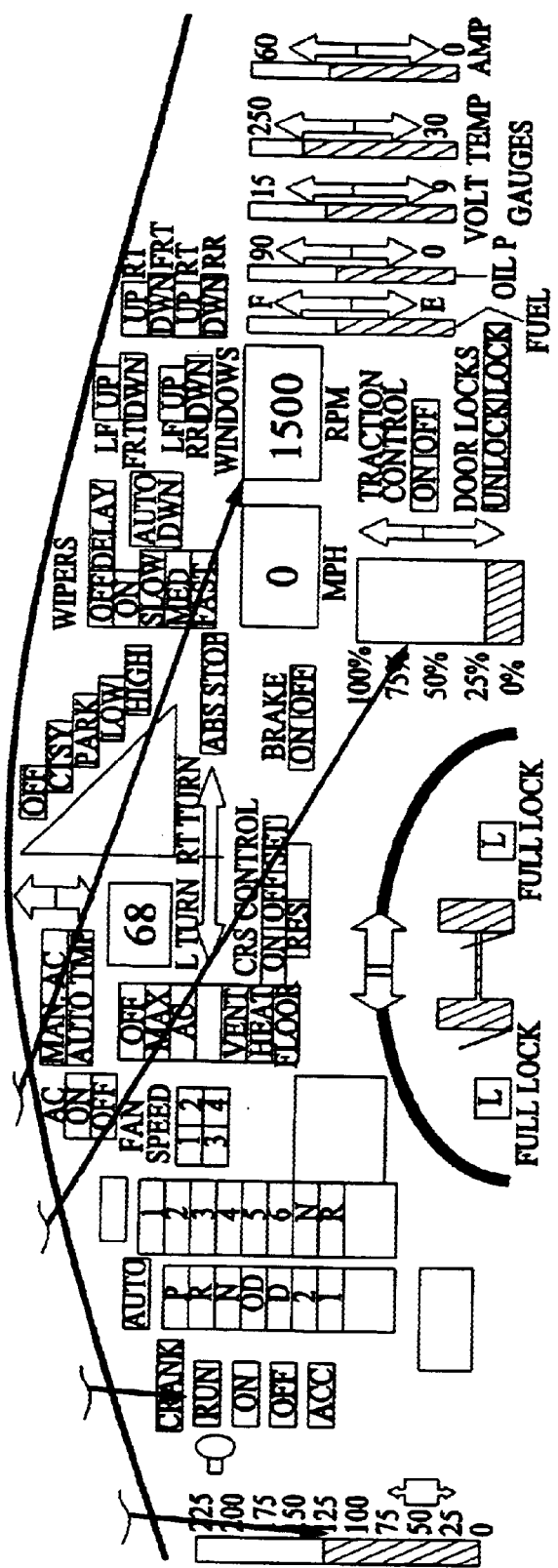

The technician will select the sensors he wishes to view the specification of each and then adjust the dashboard to match the operating conditions of the vehicle as suggested in FIG. 19 and shown in FIG. 20 where he has simulated operation of the engine at 1500 rpm with coolant temperature at 100 degrees and the throttle at 25% provoking numerous voltage specifications of the module which he can then test for correctness.

Figure 21A:
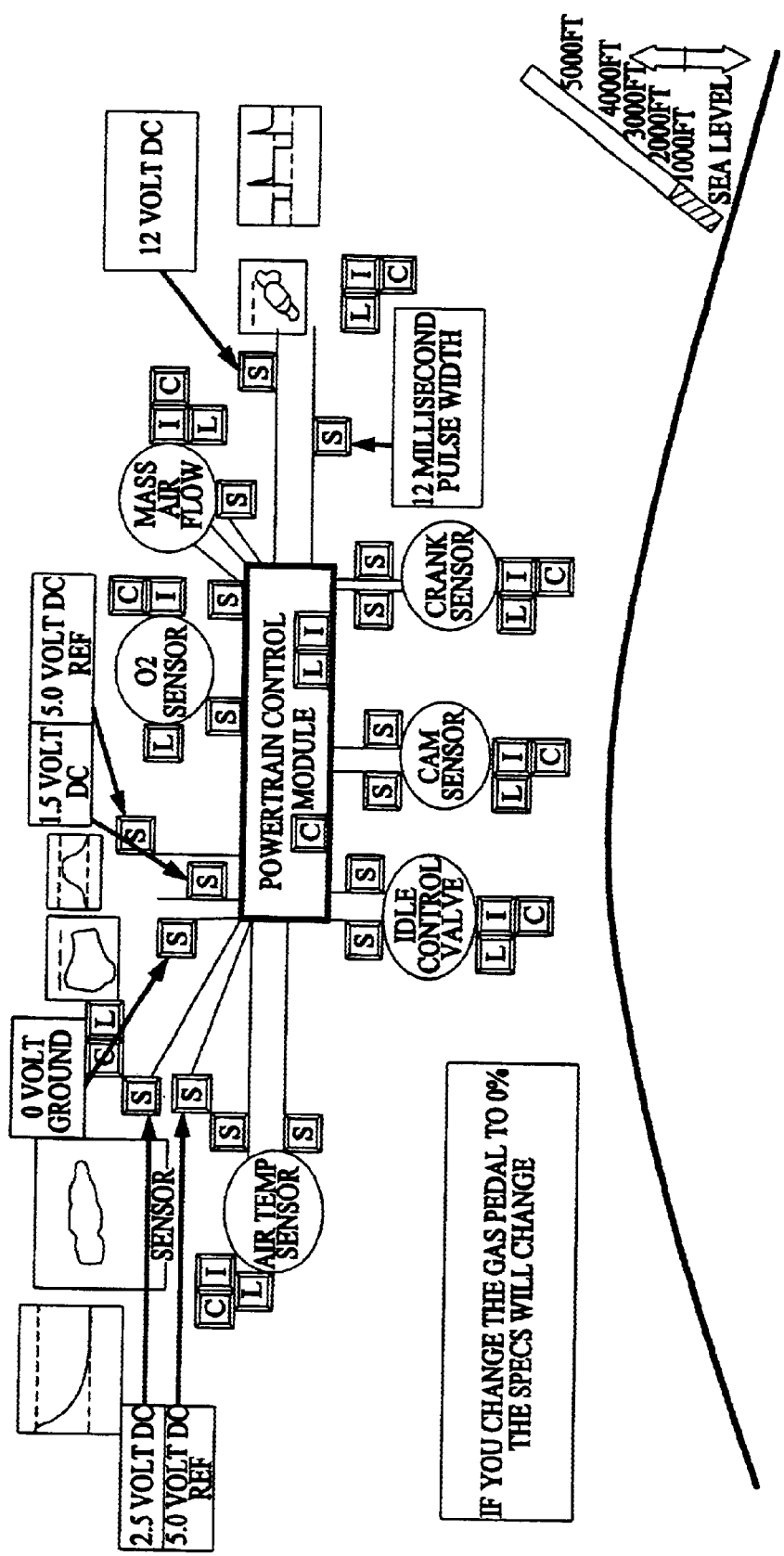
Figure 21B:
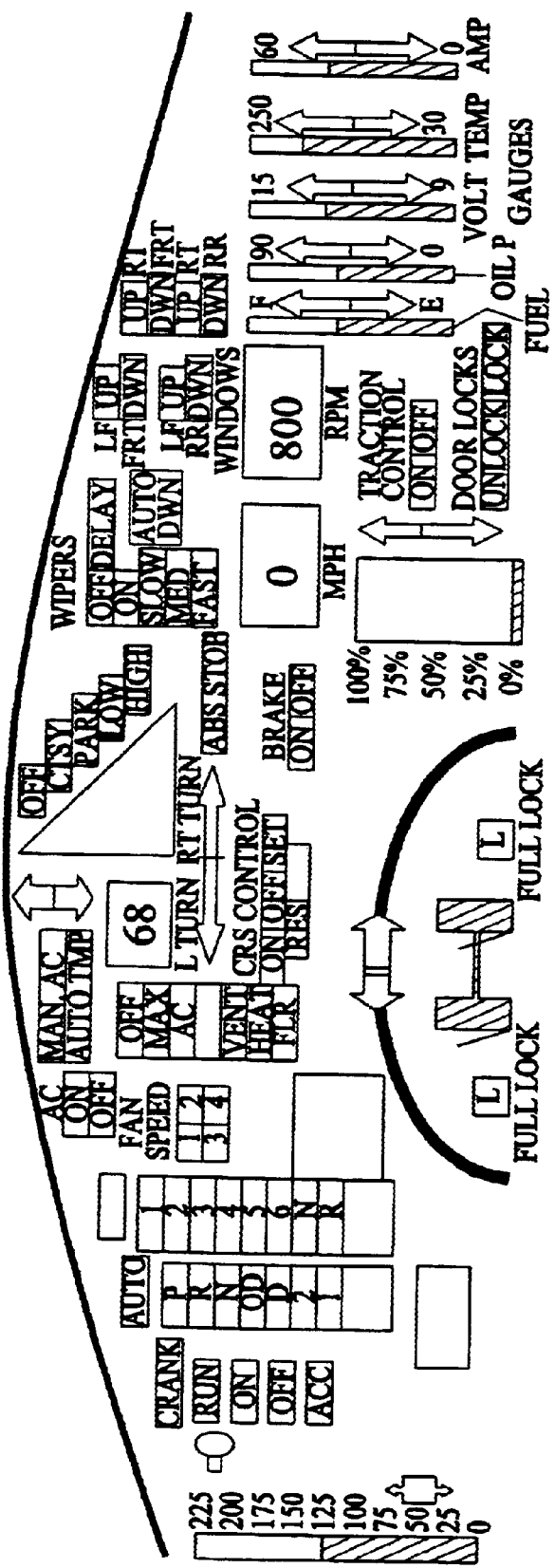
Figure 22A:
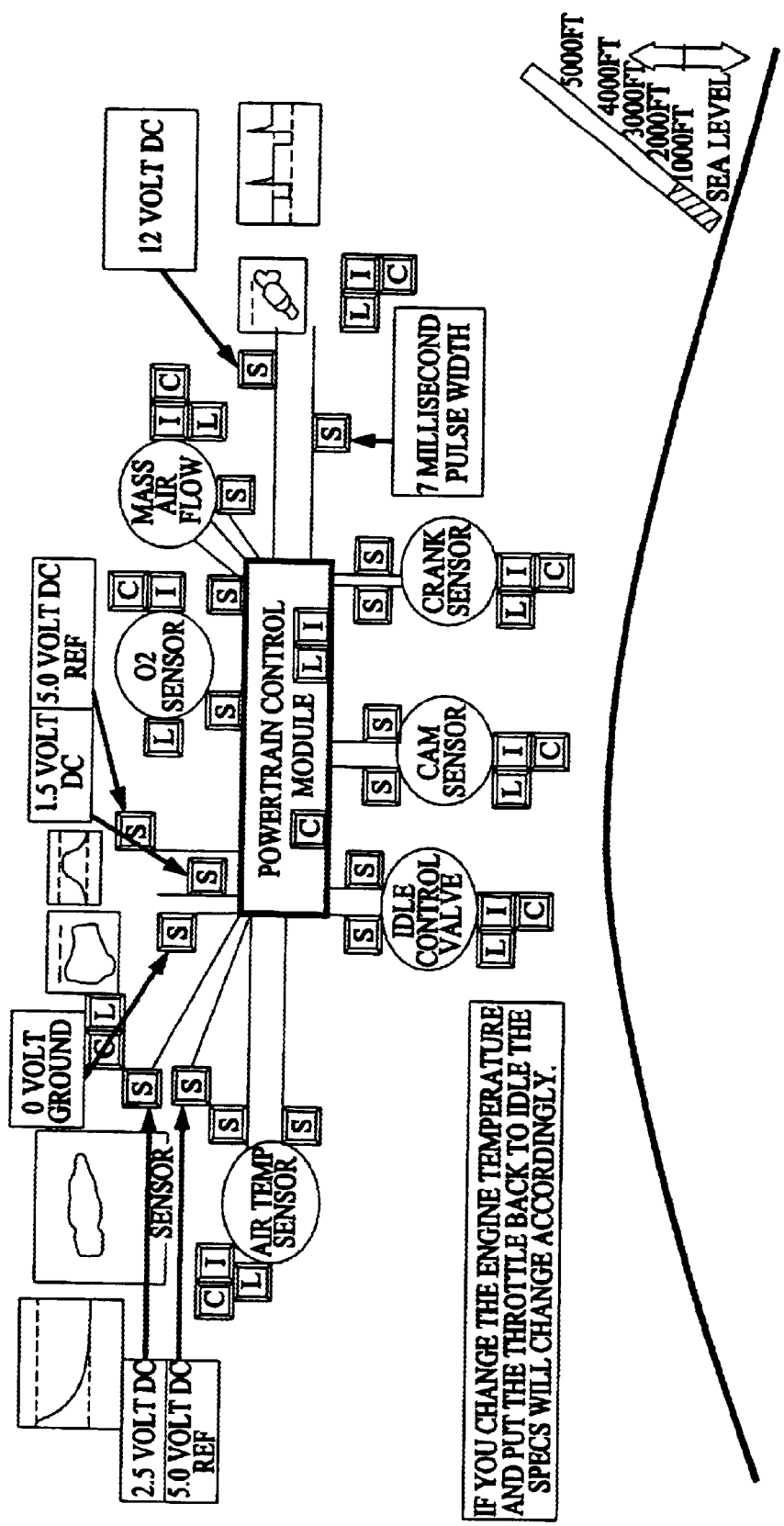
Figure 22B:
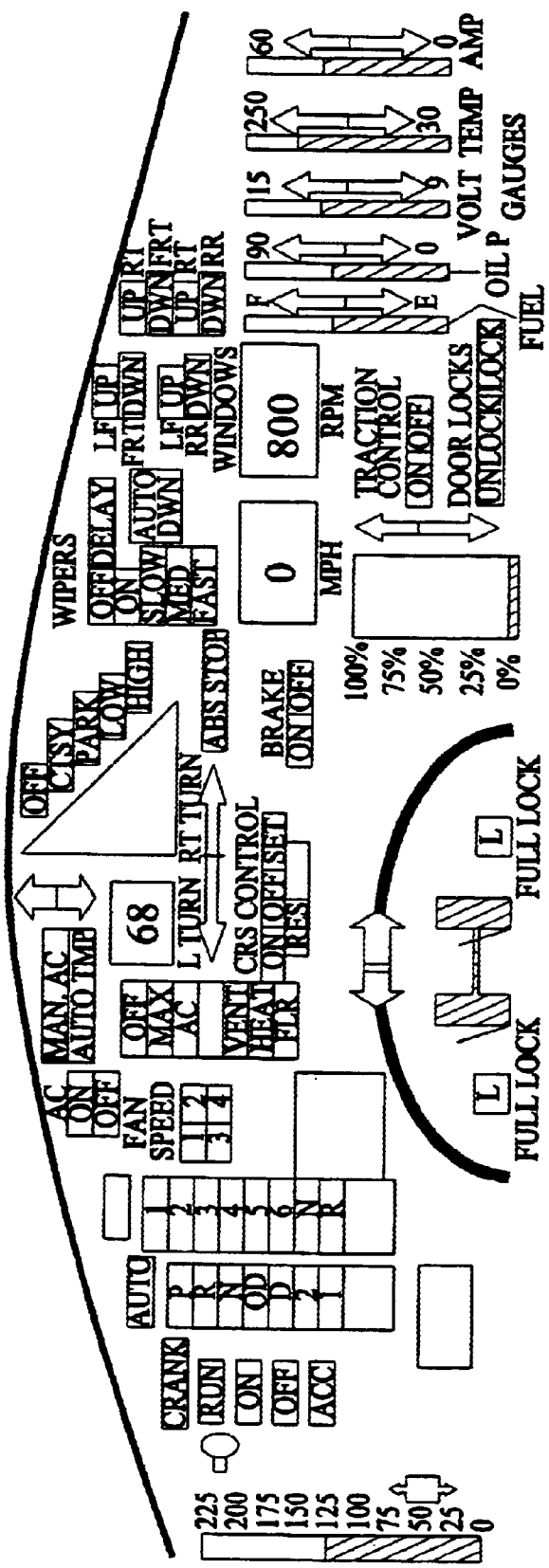
Figure 23A:
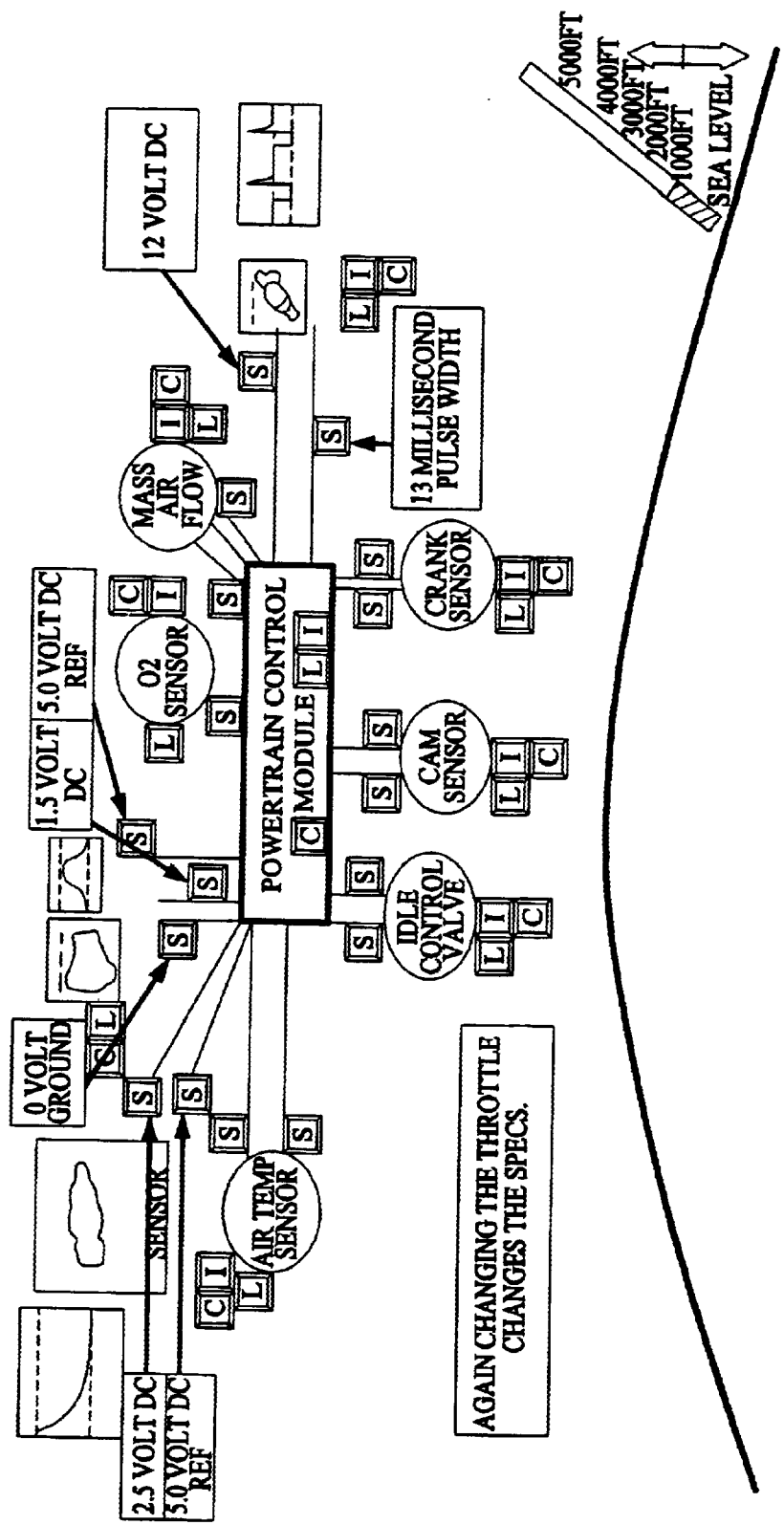
Figure 23B:
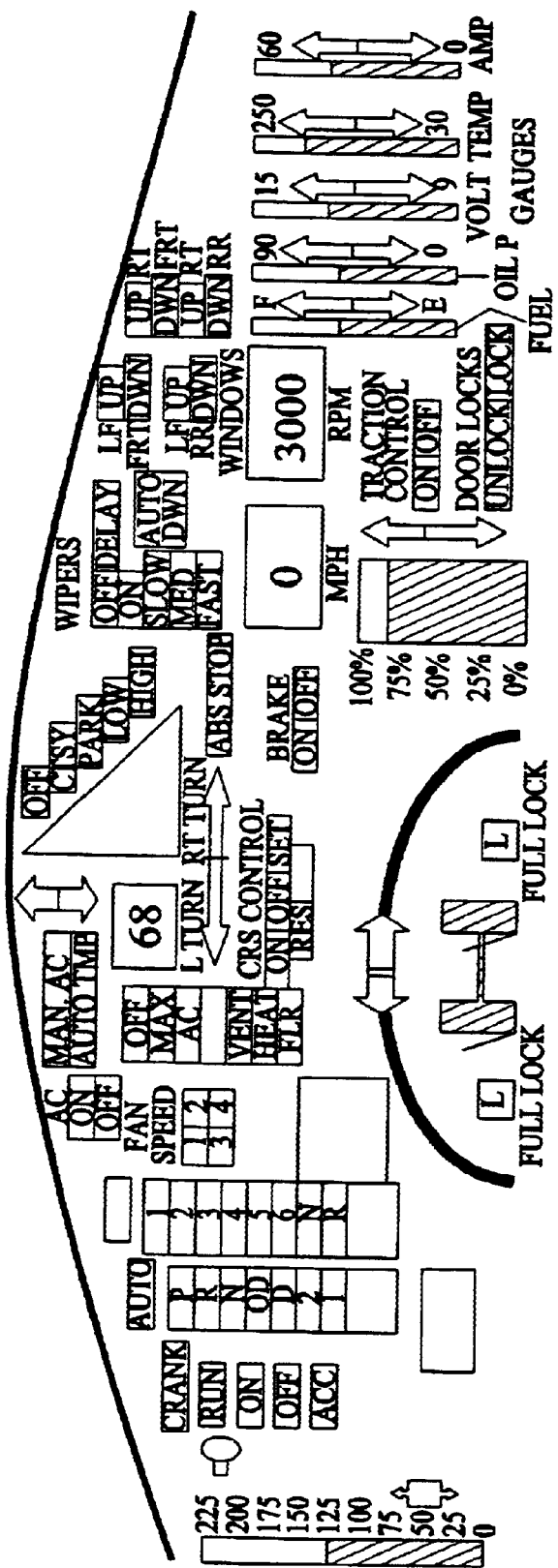

Changing the simulated operating conditions can provoke changes in the specifications derived from the library by clicking on the appropriate buttons as is apparent when you compare the specified voltage datum and pulse width of FIG. 20 where the throttle is set at 25% and engine speed of 800 rpm with FIG. 21 where the throttle is set at 0% and engine speed of 800 rpm. Further illustrative of the foregoing is seen from a comparison of voltage specifications and pulse width between FIGS. 22 and 23 where the former has the throttle set at 0%, engine speed at 800 rpm and operating temperature of 150 degrees; and, the latter has the simulated throttle at 75%, engine speed at 3000 rpm and identical operating temperature.

The exceptional advantage to the simulated program is that the technician can introduce minuscule changes to gross changes in the operating conditions and see how it affects the diagnostic system enabling him to more readily determine the problem and correct the malfunction. Although not apparent from the Figures, the screened pages can show the wires in colors and as noted actual photos could be used including ones showing the technician how to make accurate measurements and the equipment to do so.

This system uses the strategy of whatever product it is designed for, to aid in the diagnostic processes. There will no longer be a need to remember every quirk and design change in every little system to be able to diagnose the system properly. It is very visual in that it will show the user where the part is what it looks like, the specifications and the testing procedure.

This system also has simulation capabilities for when there is no known good unit around to test from. It has a (dashboard) template that looks like the controls of the actual product being tested (washing machine, personal watercraft, automobile, airplane, etc.) and allows the user to observe the operationally correct specifications by pushing the appropriate buttons on the template to match the product being tested. This will allow for less schooling and more hands on diagnostics and less systems for the technician to have to retain in memory so he can repair the product better and more efficiently.

This system can be made available via CD-ROM, DVD or via the Internet. The technician will no longer have to go from page to page of a service manual to find the information necessary for the diagnosis and repair. Just a few mouse clicks and you're there. It could also be used to help service facilities to have less return of non-defective parts since the technician can readily define what he must have for the repair of the machine. It can be Internet based so that a fee could be charged per vehicle problem. It can also be updated via the Internet. Technicians in the field could also give their feedback to the system under Tips and tricks (assuming it is useful) for review to catch vehicle problems earlier. While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A method of diagnosing a malfunction of a machinery system utilizing a video monitor onto which a single technician solely screens pages from solely from a software library comprising the steps of:
   (a) withdrawing from a first portion of said library a template onto which the technician can enter information relating to said machinery system;
   (b) manually entering said information from the single technician defining a specific machine and a malfunctioning segment onto said template;
   (c) withdrawing from a second portion of said library a screen provoked by said manually entered information from the single technician, said screen showing a schematic of the malfunctioning segment with a plurality of buttons; and,
   (d) clicking on at least one of said buttons to show a location and proper functional data whereby the single technician diagnoses the malfunctioning segment solely by interacting with said library.

2. The method according to claim 1 where said machinery system is an automobile.

3. The method according to claim 1 where said machinery system is a hydraulic system.

4. The method according to claim 1 where said machinery system is a vacuum system.

5. The method according to claim 1 where said machinery system is an electrical circuit.

6. The method according to claim 2 wherein said schematic includes the step of: providing data entry on a simulation dashboard.

7. A method for diagnosis of an automobile malfunction by a single technician with a monitor utilizing retrieval of stored information from a library having a first portion of data and a second portion of data comprising the steps of:
   (a) retrieving a page from said first portion of data onto which one introduces the product information and a problem requiring repair for a malfunction;
   (b) retrieving a selected schematic with buttons from the second portion of data from the stored library provoked by the retrieving in step(a); and,
   (c) allowing the single technician to click on various buttons on the monitor, said buttons having links to the stored library for retrieving information to diagnose the malfunction.

8. The method of claim 7 wherein said stored library is stored on a CD-ROM.

9. The method of claim 7 wherein said stored library is provided by an Internet connection to a computer providing a video connection to the monitor.

10. The method of claim 7 wherein said buttons includes the step of: retrieving at least one of: a picture, drawing, photo and representation of the location.

11. The method of claim 7 wherein said buttons includes the step of: retrieving a window with technicians' tips encountered with various diagnoses.

12. The method of claim 7 wherein said buttons includes the step of: retrieving a window with a picture of an actual component for an item selected with photo capability and terminal identifications.

13. The method of claim 7 wherein said buttons includes the step of: retrieving a window with a picture of an electrical connector for the item selected with photo capability and terminal identifications.

14. The method of claim 7 wherein said buttons includes the step of: retrieving individual and selected a window voltages settings and related points for measurements and current flow.

15. A strategy based diagnostic method having a library with a first portion of a stored database and a second portion of a stored database for diagnosing a malfunction comprising the sequential steps of:
   (a) retrieving a page from said first portion onto which one introduces product information and a problem requiring repair;
   (b) retrieving a repair schematic with buttons from the second portion of the stored library provoked by the introductions in step (a); and,
   (c) allowing only a single user to click on one of the buttons having links to the library for information to diagnose the malfunction solely from the stored database.

16. The method of claim 15 wherein the retrieved repair schematic includes the step of: providing a simulation dashboard for data entry.

17. The method of claim 15, further comprising the step of:
   providing a CD-ROM as the stored library.

18. The method of claim 1, further comprising the step of:
   simulating different operating conditions of the machinery system for the diagnosing of the malfunction solely from the software library solely by entering data information by the single technician.

19. The method of claim 7, further comprising the step of:
   simulating different operating conditions of the problem from the product information solely by the single technician for the retrieving of the information solely from the stored library to diagnose the malfunction.

20. The method of claim 15, further comprising the step of:
   simulating different operating conditions solely from the stored library of the product information solely by the single user to determine the problem to diagnose the malfunction.

* * * * *